(12) United States Patent
Yuasa

(10) Patent No.: US 10,518,638 B2
(45) Date of Patent: Dec. 31, 2019

(54) CONTROL DEVICE OF FOUR-WHEEL-DRIVE VEHICLE

(71) Applicant: TOYOTA JIDOSHA KABUSHIKI KAISHA, Toyota-shi, Aichi (JP)

(72) Inventor: Ryohei Yuasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 15/938,047

(22) Filed: Mar. 28, 2018

(65) Prior Publication Data

US 2018/0281593 A1    Oct. 4, 2018

(30) Foreign Application Priority Data

Apr. 4, 2017 (JP) ................................ 2017-074774

(51) Int. Cl.
*B60K 23/08* (2006.01)
*B60K 17/344* (2006.01)
(Continued)

(52) U.S. Cl.
CPC ........ *B60K 23/0808* (2013.01); *B60K 17/344* (2013.01); *F16D 11/14* (2013.01);
(Continued)

(58) Field of Classification Search
CPC .... B60K 23/0808; B60K 23/04; B60K 23/08; B60K 2023/043; B60K 2023/0833;
(Continued)

(56) References Cited

U.S. PATENT DOCUMENTS

2006/0266569 A1* 11/2006 Fujiwara ................. B60K 6/52
                                                          180/65.26
2013/0030664 A1*  1/2013 Yagi ...................... B60K 17/35
                                                          701/69
(Continued)

FOREIGN PATENT DOCUMENTS

JP        2009-090835 A      4/2009
JP        2016-074370 A      5/2016

*Primary Examiner* — Huan Le
(74) *Attorney, Agent, or Firm* — Oliff PLC

(57) ABSTRACT

A control device of a four-wheel-drive vehicle having an electronic control coupling changing a transmission torque, and a connecting/disconnecting mechanism connecting/disconnecting an input to the input-side rotating member of the coupling, comprising: a storage portion storing a relationship between the drive current to the coupling and the transmission torque of the coupling; a control portion controlling the drive current based on the relationship; and a learning portion performing correction for the relationship through learning by applying a braking torque to the input-side rotating member by an electromagnetic actuator. The learning portion performs the correction for the relationship by using the drive current supplied to the coupling and the braking torque at the time of determination that the transmission torque is balanced with the braking torque based on rotational speeds of the input-side rotating member and the output-side rotating member while the rotational speed of the input-side rotating member is increased.

7 Claims, 12 Drawing Sheets

(51) Int. Cl.
*F16D 11/14* (2006.01)
*F16D 48/06* (2006.01)
*F16D 11/00* (2006.01)

(52) U.S. Cl.
CPC .... *F16D 48/064* (2013.01); *B60K 2023/0858* (2013.01); *F16D 2011/006* (2013.01); *F16D 2500/10431* (2013.01); *F16D 2500/10462* (2013.01)

(58) Field of Classification Search
CPC .......... B60K 2023/0858; B60K 17/344; F16D 48/064; F16D 2500/10431; F16D 2500/10462; B60Y 2400/422
See application file for complete search history.

(56) References Cited

U.S. PATENT DOCUMENTS

| | | | |
|---|---|---|---|
| 2015/0136559 A1* | 5/2015 | Brumberger | .......... F16D 48/064 192/84.9 |
| 2016/0101689 A1 | 4/2016 | Yoshimura et al. | |
| 2016/0229405 A1* | 8/2016 | Shimizu | .............. B60W 30/182 |

\* cited by examiner

CONTROL DEVICE OF FOUR-WHEEL-DRIVE VEHICLE

This application claims priority from Japanese Patent Application No. 2017-074774 filed on Apr. 4, 2017, the disclosure of which is herein incorporated by reference in its entirety.

TECHNICAL FIELD

The present invention relates to a technique of performing a learning correction, in a four-wheel-drive vehicle that includes an electronic control coupling changing a transmission torque depending on a supplied drive current and that controls the drive current supplied to the electronic control coupling based on a preset relationship between a drive current and a transmission torque, for the relationship during running of the vehicle.

BACKGROUND ART

A four-wheel-drive vehicle is known that includes an electronic control coupling changing a transmission torque transmitted from an input-side rotating member to an output-side rotating member depending on a supplied drive current, and a connecting/disconnecting mechanism connecting/disconnecting the input-side rotating member of the electronic control coupling to transmit/interrupt an input of power through an operation of an electromagnetic actuator applying a braking torque to the input-side rotating member of the electronic control coupling. For example, this corresponds to a four-wheel-drive vehicle described in Patent Document 1. To control a behavior of the vehicle with high accuracy, a four-wheel-drive vehicle including the electronic control coupling as described above is required to highly accurately control the transmission torque regardless of variations in components of the electronic control coupling, a change of the electronic control coupling with lapse of time, etc.

In this regard, in the four-wheel-drive vehicle described in Patent Document 2, it is proposed to perform a learning correction for a relationship between the drive current supplied to the electronic control coupling and the transmission torque transmitted from the input-side rotating member to the output-side rotating member.

PRIOR ART DOCUMENTS

Patent Documents

Patent Document 1: Japanese Laid-Open Patent Publication No. 2016-074370
Patent Document 2: Japanese Laid-Open Patent Publication No. 2009-090835

SUMMARY OF THE INVENTION

Technical Problem

Since a learning correction must be performed for the relationship while the vehicle is lifted up or the vehicle is disposed on a chassis dynamometer, the four-wheel-drive vehicle of Patent Document 2 has a problem that the transmission torque of the electronic control coupling cannot highly accurately be controlled in terms of a change of the electronic control coupling with lapse of time during utilizing the vehicle.

The present invention was conceived in view of the situations and it is therefore an object of the present invention to provide a control device of a four-wheel-drive vehicle highly accurately controlling a transmission torque in terms of a change of the electronic control coupling with lapse of time during utilizing a vehicle.

Solution to Problem

To achieve the above object, a first aspect of the present invention provides a control device of a four-wheel-drive vehicle having an electronic control coupling changing a transmission torque transmitted from an input-side rotating member to an output-side rotating member depending on a supplied drive current, and a connecting/disconnecting mechanism connecting/disconnecting an input of power to the input-side rotating member of the electronic control coupling through an operation of an electromagnetic actuator applying a braking torque to the input-side rotating member of the electronic control coupling, the control device comprising: a storage portion storing a first relationship between the drive current supplied to the electronic control coupling and the transmission torque of the electronic control coupling; a control portion controlling the drive current supplied to the electronic control coupling based on the first relationship; and a learning portion performing a correction for the first relationship through learning by applying the braking torque to the input-side rotating member by the electromagnetic actuator, wherein the learning portion performs the correction for the first relationship stored in the storage portion by using the drive current supplied to the electronic control coupling and the braking torque at the time of determination that the transmission torque is balanced with the braking torque based on a rotational speed of the input-side rotating member and a rotational speed of the output-side rotating member while the rotational speed of the input-side rotating member is increased by the control portion.

A second aspect of the invention provides the control device of a four-wheel-drive vehicle recited in the first aspect of the invention, wherein the control portion increases the transmission torque of the electronic control coupling from a torque lower than the braking torque when the braking torque is applied to the input-side rotating member of the electronic control coupling, and thereby increases the rotation speed of the input-side rotating member reduced lower than the rotation speed of the output-side rotating member by the braking torque.

A third aspect of the invention provides the control device of a four-wheel-drive vehicle recited in the first or second aspect of the invention, wherein the electromagnetic actuator changes the braking torque applied to the input-side rotating member according to a first drive current supplied thereto, and wherein the control device comprises a first storage portion storing a second relationship between the first drive current supplied to the electromagnetic actuator and the braking torque, a first control portion controlling the first drive current supplied to the electromagnetic actuator based on the second relationship, and a first learning portion performing a correction for the second relationship through learning.

A fourth aspect of the invention provides the control device of a four-wheel-drive vehicle recited in any one of the first through third aspects of the invention, comprising a torque balance determining portion determining whether the transmission torque is balanced with the braking torque, wherein the torque balance determining portion determines that the transmission torque is balanced with the braking torque when the rotation speed of the input-side rotating member is synchronized with the rotation speed of the output-side rotating member.

A fifth aspect of the invention provides the control device of a four-wheel-drive vehicle recited in any one of the second through fourth aspects of the invention, wherein the electronic control coupling is comprised of a pair of electronic control couplings transmitting a torque output from an output shaft respectively to a pair of auxiliary drive wheels, wherein the connecting/disconnecting mechanism connects/disconnects a power transmission path between a ring gear and the output shaft, wherein the ring gear is coupled in a power transmittable manner to a propeller shaft to which a portion of a drive power transmitted from a drive power source is input, wherein the connecting/disconnecting mechanism disconnects the power transmission path between the ring gear and the output shaft before applying the braking torque to the input-side rotating member by the electromagnetic actuator, and wherein the control portion increases the transmission torque of one of the pair of electronic control couplings from zero when the braking torque is applied on the input-side rotating member of the electronic control coupling.

A sixth aspect of the invention provides the control device of a four-wheel-drive vehicle recited in the fifth aspect of the invention, wherein the four-wheel-drive vehicle includes a first connecting/disconnecting mechanism connecting/disconnecting a power transmission path between the drive power source and the propeller shaft, and wherein the first connecting/disconnecting mechanism disconnects the power transmission path between the drive power source and the propeller shaft before applying the braking torque to the input-side rotating member by the electromagnetic actuator.

A seventh aspect of the invention provides the control device of a four-wheel-drive vehicle recited in the fifth or sixth aspect of the invention, wherein the connecting/disconnecting mechanism includes a connecting/disconnecting sleeve including second connecting/disconnecting teeth that are meshed with first connecting/disconnecting teeth formed on the ring gear, disposed relatively non-rotatably and movably in a rotation axis direction with respect to the output shaft, and moved between a meshing position at which the second connecting/disconnecting teeth are meshed with the first connecting/disconnecting teeth and a non-meshing position at which the second connecting/disconnecting teeth are not meshed with the first connecting/disconnecting teeth, a return spring urging the connecting/disconnecting sleeve in a direction from the non-meshing position toward the meshing position, a piston disposed relatively rotatably with respect to the output shaft and moving the connecting/disconnecting sleeve to the non-meshing position against the urging force of the return spring, a ball cam including a pair of cam members relatively rotated around the rotation axis by an operation of the electromagnetic actuator and a spherical rolling element sandwiched between groove-shaped cam surfaces respectively firmed on facing surfaces of the pair of cam members so that when the pair of cam members is relatively rotated, one of the pair of cam members is moved toward the piston, and a holder having a plurality of levels of latching teeth and disposed relatively non-rotatably and non-movably in the rotation axis direction with respect to the output shaft to latch the piston with each one tooth of the plurality of levels of latching teeth so as to position the connecting/disconnecting sleeve at the meshing position or the non-meshing position, and wherein by applying the braking torque to the other of the pair of cam members through the operation of the electromagnetic actuator to relatively rotate the pair of cam members, one of the pair of cam members is reciprocated to change a position of latching of the piston with the holder, so that the connecting/disconnecting sleeve is moved between the non-meshing position and the meshing position.

Advantageous Effects of Invention

According to the first aspect of the invention, the control device includes the storage portion storing the first relationship between the drive current supplied to the electronic control coupling and the transmission torque of the electronic control coupling, the control portion controlling the drive current supplied to the electronic control coupling based on the first relationship, and the learning portion performing learning correction for the first relationship by applying the braking torque to the input-side rotating member by the electromagnetic actuator, and the learning portion performs the learning correction for the first relationship stored in the storage portion with the drive current and the braking torque supplied to the electronic control coupling when the rotation speed of the input-side rotating member is increased by the control portion and it is determined that the transmission torque is balanced with the braking torque based on the rotation speed of the input-side rotating member and the rotation speed of the output-side rotating member. Therefore, when the rotation speed of the input-side rotating member is increased by the control portion at the time of application of the braking torque to the input-side rotating member during running of the vehicle and it is determined that the transmission torque is balanced with the braking torque based on the rotation speed of the input-side rotating member and the rotation speed of the output-side rotating member, the learning correction is performed for the first relationship stored in the storage portion, so that the transmission torque can highly accurately be controlled with respect to a change of the electronic control coupling with lapse of time during utilizing the vehicle.

According to the second aspect of the invention, the control portion increases the transmission torque of the electronic control coupling from the torque lower than the braking torque when the braking torque is applied to the input-side rotating member of the electronic control coupling, and thereby increases the rotation speed of the input-side rotating member reduced lower than the rotation speed of the output-side rotating member by the braking torque, and therefore, it can preferably be determined that the transmission torque is balanced with the braking torque based on the rotation speed of the input-side rotating member and the rotation speed of the output-side rotating member.

According to the third aspect of the invention, the electromagnetic actuator changes the braking torque applied to the input-side rotating member according to the first drive current, and the control device includes the first storage portion storing the second relationship between the first drive current supplied to the electromagnetic actuator and the braking torque, the first control portion controlling the first drive current supplied to the electromagnetic actuator based on the second relationship, and the first learning portion performing the learning correction for the second relationship. Therefore, the learning correction for the second relationship is performed by the first learning portion and the braking torque of the electromagnetic actuator can highly accurately be controlled, so that the transmission torque of the electronic control coupling can preferably highly accurately be controlled with respect to a change of the electronic control coupling with lapse of time during utilizing the vehicle.

According to the fourth aspect of the invention, the torque balance determining portion is included that determines whether the transmission torque is balanced with the braking torque, and the torque balance determining portion determines that the transmission torque is balanced with the braking torque when the rotation speed of the input-side rotating member is synchronized with the rotation speed of the output-side rotating member. Therefore, for example, by using the rotation speed sensors detecting the rotation speed of the input-side rotating member and the rotation speed of the output-side rotating member without using torque sensors each detecting the transmission torque and the braking torque, it can relatively highly accurately be determined whether the transmission torque is balanced with the braking torque.

According to the fifth aspect of the invention, the electronic control coupling is comprised of a pair of electronic control couplings transmitting the torque output from the output shaft respectively to the pair of the auxiliary drive wheels; the connecting/disconnecting mechanism connects/disconnects the power transmission path between the ring gear coupled in a power transmittable manner to the propeller shaft to which a portion of the drive power transmitted from the drive power source is input, and the output shaft; the connecting/disconnecting mechanism disconnects the power transmission path between the ring gear and the output shaft before applying the braking torque to the input-side rotating member by the electromagnetic actuator; and the control portion increases the transmission torque of one of the pair of the electronic control couplings from zero when the braking torque is applied on the input-side rotating member of the electronic control coupling. Therefore, after switching from the four-wheel-drive running to the two-wheel-drive running where the power transmission path between the ring gear and the output shaft is disconnected by the connecting/disconnecting mechanism during running of the vehicle, the learning portion performs the learning correction for the first relationship stored in the storage portion in one of the pair of the electronic control couplings.

According to the sixth aspect of the invention, the four-wheel-drive vehicle includes the first connecting/disconnecting mechanism connecting/disconnecting the power transmission path between the drive power source and the propeller shaft, and the first connecting/disconnecting mechanism disconnects the power transmission path between the drive power source and the propeller shaft before applying the braking torque to the input-side rotating member by the electromagnetic actuator. Therefore, after switching from the four-wheel-drive miming to the two-wheel-drive running where the propeller shaft transmitting the drive power to the auxiliary drive wheels is disconnected from the auxiliary drive wheels by the connecting/disconnecting mechanism and the first co disconnecting mechanism during running of the vehicle, the learning correction is performed by the learning portion for the first relationship stored in the storage portion in one of the pair of the electronic control couplings.

According to the seventh aspect of the invention, the connecting/disconnecting mechanism includes: the connecting/disconnecting sleeve having the second connecting/disconnecting teeth that can be meshed with the first connecting/disconnecting teeth formed on the ring gear, disposed relatively non-rotatably and movably in the rotation axis direction with respect to the output shaft, and moved between the meshing position at which the second connecting/disconnecting teeth are meshed with the first connecting/disconnecting teeth and the non-meshing position at which the second connecting/disconnecting teeth are not meshed with the first connecting/disconnecting teeth; the return spring urging the connecting/disconnecting sleeve from the non-meshing position toward the meshing position; the piston disposed relatively rotatably with respect to the output shaft and moving the connecting/disconnecting sleeve to the non-meshing position against the urging force of the return spring; the ball cam having a pair of the cam members relatively rotated around the rotation axis by the operation of the electromagnetic actuator and the spherical rolling element sandwiched between the groove-shaped cam surfaces respectively formed on the facing surfaces of the pair of the cam members so that when the pair of the cam members is relatively rotated, one of the pair of the cam members is moved toward the piston; and the holder having the plurality of levels of the latching teeth and disposed relatively non-rotatably and non-movably in the rotation axis direction with respect to the output shaft to latch the piston with each one tooth of the plurality of levels of the latching teeth so as to position the connecting/disconnecting sleeve at the meshing position or the non-meshing position, and by applying the braking torque to the other of the pair of the cam members through the operation of the electromagnetic actuator to relatively rotate the pair of the cam members, one of the pair of the cam members is reciprocated to change the position of latching of the piston with the holder, so that the connecting/disconnecting sleeve is moved between the non-meshing position and the meshing position. Therefore, by applying the braking torque to the other of the pair of the cam members through the operation of the electromagnetic actuator after the connecting/disconnecting sleeve is moved to the non-meshing position by the connecting/disconnecting mechanism, the rotation speed of the input-side rotating member is preferably reduced lower than the rotation speed of the output-side rotating member.

MODES FOR CARRYING OUT THE INVENTION

Examples of the present invention will now be described in detail with reference to the drawings. In the following example, the figures are simplified or deformed as needed and portions are not necessarily precisely drawn in terms of dimension ratio, shape, etc.

First Example

Figure 1:
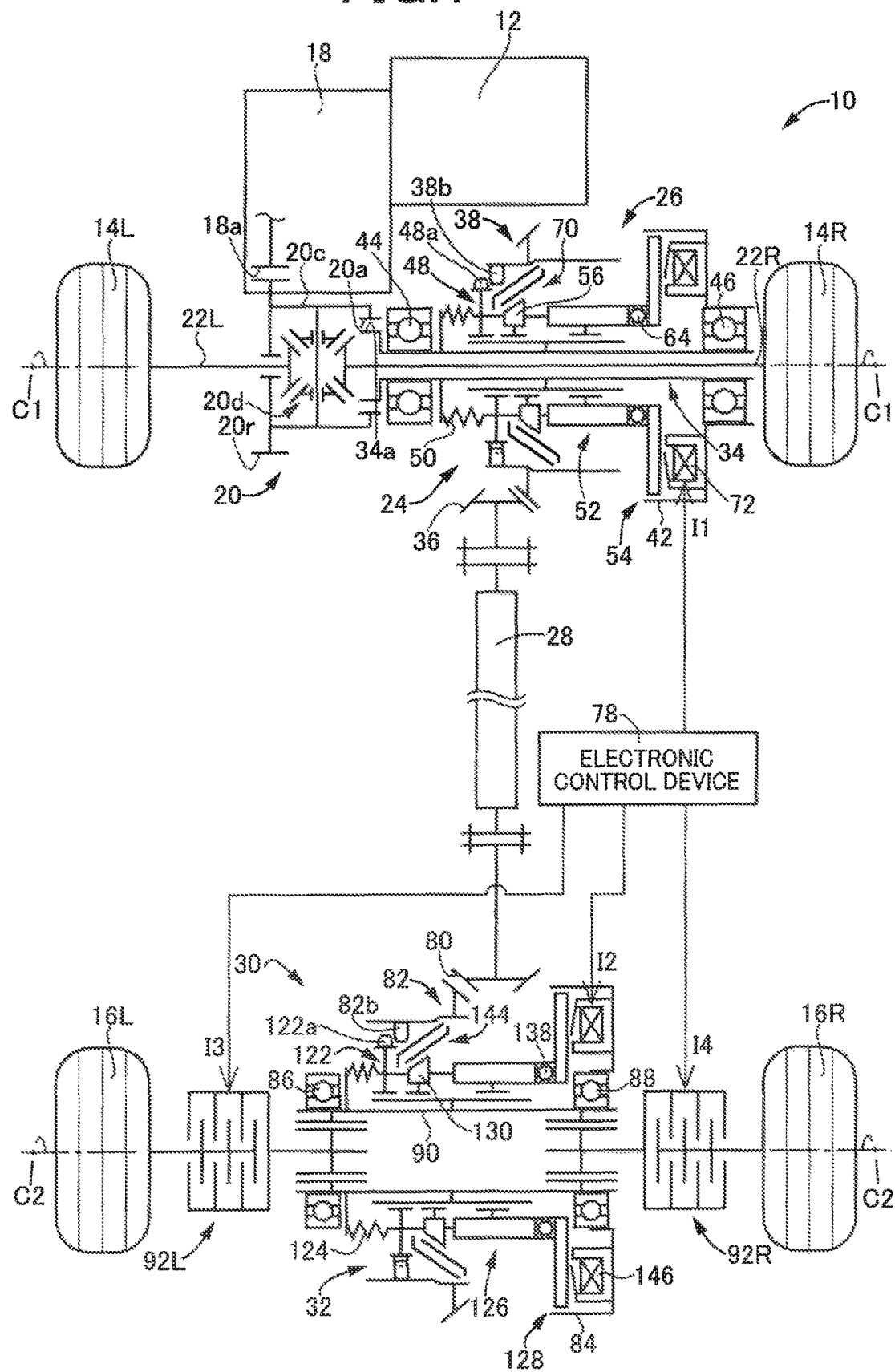
FIG. 1 is a skeleton diagram for generally explaining a configuration of a four-wheel-drive vehicle to which the present invention is preferably applied.

FIG. 1 is a skeleton diagram for generally explaining a configuration of a four-wheel-drive vehicle 10 to which the present invention is preferably applied. In FIG. 1, the four-wheel-drive vehicle 10 includes a four-wheel-drive device of an FF type having a first power transmission path transmitting a drive power of an engine 12 serving as a drive power source to left and right front wheels 14L, 14R corresponding to main drive wheels and a second power transmission path transmitting the drive power of the engine 12 to left and right rear wheels 16L, 16R corresponding to auxiliary drive wheels. In a two-wheel-drive state of the four-wheel-drive vehicle 10, the drive power transmitted from the engine 12 via an automatic transmission 18 is transmitted through a front-wheel drive-power distributing device 20 and left and right axles 22L, 22R to the left and right front wheels 14L, 14R. In this two-wheel-drive state, at least a first clutch (first connecting/disconnecting mechanism) 24 disposed in a transfer 26 is released, and no drive power is transmitted to a propeller shaft 28 as well as a rear-wheel drive-power distributing device 30 and the rear wheels 16L, 16R. However, in a four-wheel-drive state, the first clutch 24 and a second clutch (connecting/disconnecting mechanism) 32 are both engaged in addition to the two-wheel-drive state, and the drive power from the engine 12 is transmitted to the propeller shaft 28 as well as the rear-wheel chive-power distributing device 30 and the rear wheels 16L, 16R. The first clutch 24 is a connecting/disconnecting mechanism selectively connecting/interrupting (disconnecting) a power transmission path between the engine 12 and the propeller shaft 28.

As shown in FIG. 1, the front-wheel drive-power distributing device 20 has a ring gear 20r rotatably disposed around a first rotation axis C1 and meshed with an output gear 18a of the automatic transmission 18, a differential case 200 fixed to the ring gear 20r, and a differential gear mechanism 20d housed in the differential case 20c, and transmits the drive power transmitted to the ring gear 20r to the left and right axles 22L, 22R while allowing differential rotation between the left and right axles 22L, 22R coupled to the front wheels 14L, 14R. The differential case 20c is provided with inner-circumferential meshing teeth 20a fitted to first outer-circumferential spline teeth 34a formed at an end portion on the differential case 20c side of a cylindrical input shaft 34 disposed in the transfer 26. As a result, a portion of the drive power transmitted from the engine 12 is input through the input shaft 34 to the transfer 26, and thus to the propeller shaft 28 in addition to through the differential case 20c to the left and right front wheels 14L, 14R.

Figure 2:
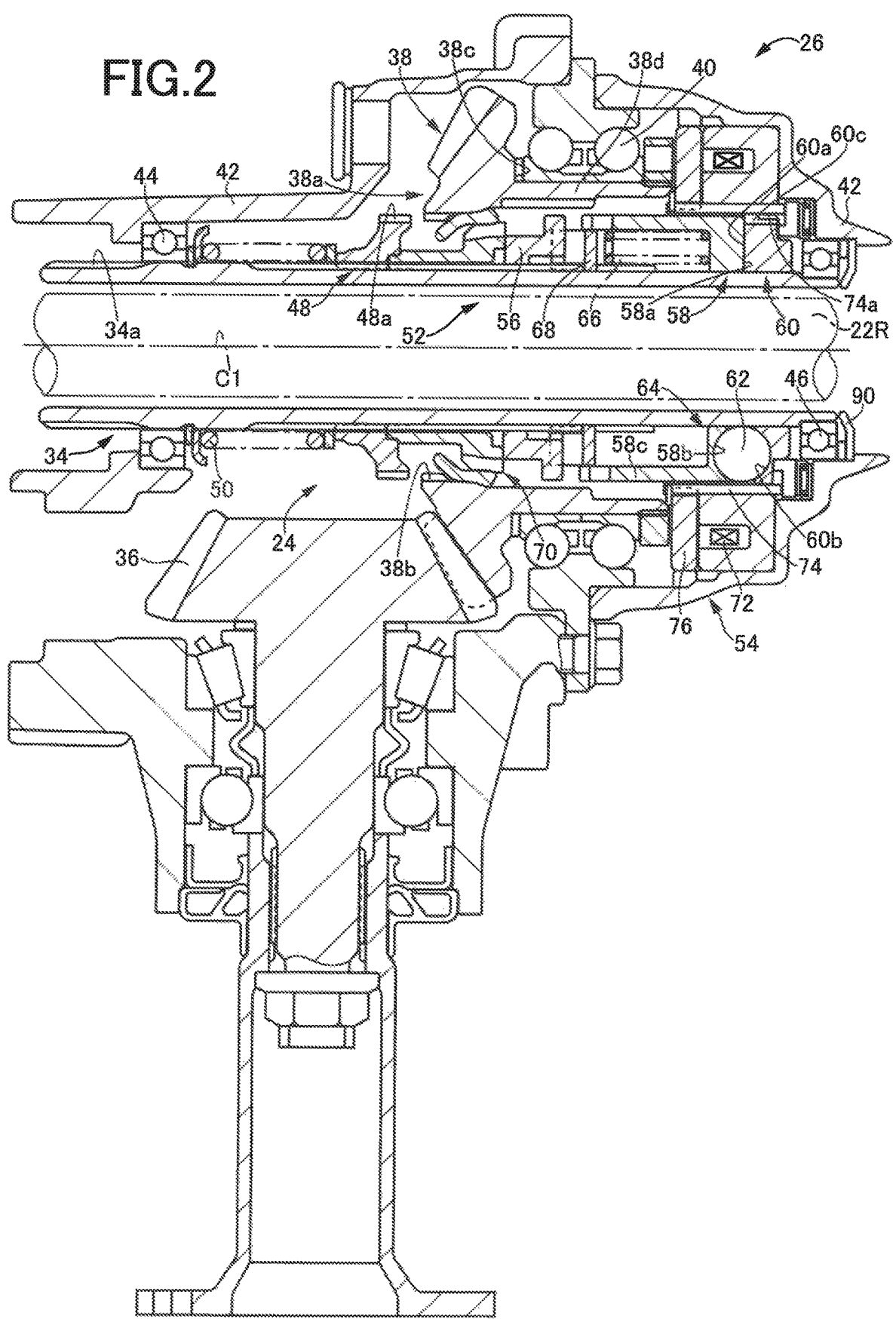
FIG. 2 is a cross-sectional view for explaining a configuration of a transfer disposed on the four-wheel-drive vehicle of FIG. 1.

As shown in FIGS. 1 and 2, the transfer 26 includes: a cylindrical first ring gear 38 meshed with a driven pinion 36 coupled to an end portion of the propeller shaft 28 on the side of the front wheels 14L, 14R; the cylindrical input shaft 34 to which a portion of the drive power transmitted from the engine 12 through the differential case 20c to the front wheels 14L, 14R is input; and the first clutch 24 connecting/disconnecting a power transmission path between the differential case 20c and the propeller shaft 28, i.e., between the input shaft 34 coupled to the differential case 20c and the first ring gear 38 coupled to the propeller shaft 28, in the power transmission path from the engine 12 to the propeller shaft 28, so that when the first clutch 24 is engaged and a power transmission path between the input shaft 34 and the first ring gear 38 is established, a portion of the drive power transmitted from the engine 12 is output through the propeller shaft 28 to the left and right rear wheels 16L, 16R in addition to being output to the left and right front wheels 14L, 14R.

As shown in FIG. 2, the first ring gear 38 is a bevel gear having helical teeth or a hypoid gear formed thereon, for example. The first ring gear 38 is integrally provided with a substantially cylindrically-shaped cylindrical portion 38a formed on a radially inner side of the first ring gear 38 and first inner-circumferential connecting/disconnecting teeth 38b formed on a radially inner side of an end portion of the cylindrical portion 38a on the front wheel 14L side. The cylindrical portion 38a is provided with a shaft portion 38d projected in a substantially cylindrical shape from a side surface 38c of the first ring gear 38 toward the front wheel 14R, and the shaft portion 38d is supported by a unit case 42 via a bearing 40. Therefore, the first ring gear 38 is supported rotatably around the first rotation axis C1 by the unit case 42 via the bearing 40 in a cantilevered manner.

As shown in FIG. 2, the input shaft 34 penetrates the inside of the cylindrical portion 38a of the first ring gear 38 such that a portion of the input shaft 34 is disposed inside the cylindrical portion 38a of the first ring gear 38. Both end portions of the input shaft 34 are supported by the unit case 42 via a first bearing 44 and a second bearing 46 respectively, so that the input shaft 34 is supported rotatably around the first rotation axis C1, i.e., rotatably concentrically with the first ring gear 38.

The first clutch 24 is a connecting/disconnecting mechanism for connecting/disconnecting the power transmission path between the input shaft 34 and the first ring gear 38 in the transfer 26. As shown in FIG. 2, the first clutch 24 includes a first connecting/disconnecting sleeve 48 disposed movably in the first rotation axis C1 direction relative to the input shaft 34 and relatively non-rotatably with respect to the input shaft 34 and having first outer-circumferential connecting/disconnecting teeth 48a formed on an outer circumference, a coil-shaped first return spring 50 urging the first connecting/disconnecting sleeve 48 from a first non-meshing position toward a first meshing position, a first movement mechanism 52 moving the first connecting/disconnecting sleeve 48 in the first rotation axis C1 direction to move the first connecting/disconnecting sleeve 48 between the first meshing position and the first non-meshing position, and a first electromagnetic actuator 54 driving the first movement mechanism 52. The first meshing position is a position to which the first connecting/disconnecting sleeve 48 is moved in the first rotation axis C1 direction by the first movement mechanism 52 so that the first outer-circumferential connecting/disconnecting teeth 48a of the first connecting/disconnecting sleeve 48 are meshed with the first inner-circumferential connecting/disconnecting teeth 38b of the first ring gear 38 and, at the first meshing position, the first ring gear 38 and the input shaft 34 cannot relatively rotate. The first non-meshing position is a position to which the first connecting/disconnecting sleeve 48 is moved in the first rotation axis C1 direction by the first movement mechanism 52 so that the first outer-circumferential connecting/disconnecting teeth 48a of the first connecting/disconnecting sleeve 48 are not meshed with the first inner-circumferential connecting/disconnecting teeth 38b of the first ring gear 38 and, at the first non-meshing position, the first ring gear 38 and the input shaft 34 can relatively rotate. The first return spring 50 is interposed between the first bearing 44 and the first connecting/disconnecting sleeve 48 in a preloaded state, and the first connecting/disconnecting sleeve 48 is urged by the first return spring 50 in the first rotation axis C1 direction toward the front wheel 14R.

As shown in FIG. 2, the first movement mechanism 52 includes: a first piston 56 disposed relatively rotatably around the first rotation axis C1 with respect to the input shaft 34 to move the first connecting/disconnecting sleeve 48 to the first non-meshing position against the urging force of the first return spring 50; a first ball cam 64 having a pair of annular first cam member 58 and second can member 60 relatively rotated around the first rotation axis C1 by the operation of the first electromagnetic actuator 54 and a first spherical rolling element 62 sandwiched between groove-shaped cam surfaces 58b, 60b respectively formed on facing surfaces 58a, 60a on which the pair of the first cam member 58 and the second cam member 60 face each other so that when the pair of the first cam member 58 and the second cam member 60 is relatively rotated around the first rotation axis C1, the first cam member 58 is moved toward the first piston 56; a second return spring 66 urging the first cam member 58 toward the second cam member 60; and a first holder 68 having multiple levels (in this example, two levels) of first latching teeth (see FIGS. 4A to 4E) 68a and second latching teeth (see FIGS. 4A to 4E) 68b and disposed relatively non-rotatably around the first rotation axis C1 and non-movably in the first rotation axis C1 direction with respect to the input shaft 34 to latch the first piston 56 with the first latching teeth 68a or the second latching teeth 68b. The first movement mechanism 52 has a first synchronizing device 70 disposed between the first connecting/disconnecting sleeve 48 and the first piston 56 to synchronize the rotation (rotation speed) of the input shaft 34, i.e., the first connecting/disconnecting sleeve 48, and the rotation (rotation speed) of the first ring gear 38 when the first connecting/disconnecting sleeve 48 moves from the first non-meshing position to the first meshing position.

As shown in FIG. 2, the first electromagnetic actuator 54 includes an annular first electromagnetic coil 72 integrally fixed to the unit case 42, an annular member 74 rotatably supported around the first rotation axis C1 with respect to the unit case 42, and an annular first movable piece 76 disposed on the outer circumferential side of the annular member 74 adjacently to the first electromagnetic coil 72. The first movable piece 76 is disposed relatively non-rotatably with respect to the annular member 74 and movably in the first rotation axis C1 direction relative to the annular member 74. On an inner circumference of the annular member 74, inner-circumferential spline teeth 74a meshed with outer-circumferential spline teeth 60c formed on an outer circumference of the second cam member 60 are formed so that the second cam member 60 is made relatively non-rotatable with respect to the annular member 74 and movable in the first rotation axis C1 direction relative to the annular member 74. Although not shown, on an inner circumferential surface of the first cam member 58, inner-circumferential meshing teeth meshed with outer-circumferential spline teeth formed on the input shaft 34 are formed relatively non-rotatably and movably in the first rotation axis C1 direction with respect to the input shaft 34.

In the first electromagnetic actuator 54 configured as described above, for example, when the first movable piece 76 is attracted to the first electromagnetic coil 72 due to a first drive current I1 (see FIG. 1) supplied from an electronic control device (control device) 78 to the first electromagnetic coil 72 while the vehicle is running and the input shaft 34 is rotating around the first rotation axis C1, since the first movable piece 76 is attracted to the first electromagnetic coil 72 integrally fixed to the unit case 42 that is a non-rotating member, a braking torque is applied to the second cam member 60 via the annular member 74. Therefore, when the braking torque is applied to the second cam member 60 by the first electromagnetic actuator 54, the relative rotation between the first cam member 58 and the second cam member 60 moves the first cam member 58 toward the first piston 56 against the urging forces of the first return spring 50 and the second return spring 66 in the first rotation axis C1 direction via the first spherical rolling element 62, and moves the first connecting/disconnecting sleeve 48 toward the front wheel 14L via the first piston 56 etc. When the first electromagnetic actuator 54 is deactivated from an activated state by the electronic control device 78, i.e. when the supply of the first drive current I1 is stopped in the state in which the first drive current I1 is supplied from the electronic control device 78 to the first electromagnetic coil 72, the first connecting/disconnecting sleeve 48 is moved toward the front wheel 14R by the urging force of the first return spring 50, and the first cam member 58 is moved in the direction toward the second cam member 60 by the urging force of the second return spring 66.

FIGS. 4A to 4F are schematic views for explaining an operation principle of the first movement mechanism 52 and shows a state in which the annular first piston 56, a pressing portion 58c formed on the annular first cam member 58, and the annular first holder 68 are each developed. As shown in FIGS. 4A to 4E, the annular first piston 56 is provided with a projection 56a projected toward the first holder 68. The annular first holder 68 has the first latching teeth 68a and the second latching teeth 68b periodically formed into a saw tooth shape and arranged in the circumferential direction for latching the projection 56a of the first piston 56; and the first holder 68 is disposed at a fixed position on the input shaft 34. The pressing portion 58c of the annular first cam member 58 has two levels of first receiving teeth 58d and second receiving teeth 58e periodically formed into the saw tooth shape similar to the first latching teeth 68a and the second latching teeth 68b of the first holder 68 and arranged in the circumferential direction in a shape shifted by a predetermined phase in the circumferential direction to receive the projection 56a of the first piston 56. The pressing portion 58c of the annular first cam member 58 is disposed relatively non-rotatably and movably in the first rotation axis C1 direction with respect to the first holder 68, and can move the first piston 56 by one stroke of the first ball cam 64 against the urging forces of the first return spring 50 and the second return spring 66. Slopes at tips of the second receiving teeth 58e of the pressing portion 58c of the first cam member 58 and the second latching teeth 68b of the first holder 68 are respectively provided with stoppers 58f and 68c stopping a slip of the projection 56a of the first piston 56.

Figure 4A:
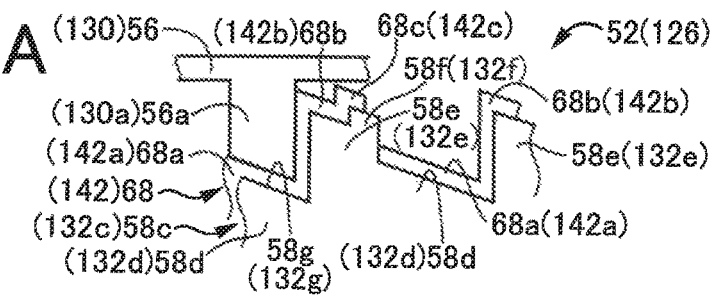
FIGS. 4A to 4E are schematic views for explaining an operation principle of a first movement mechanism disposed in the transfer of FIG. 2 and a second movement mechanism disposed in the rear-wheel drive-power distributing device of FIG. 3.
Figure 4B:
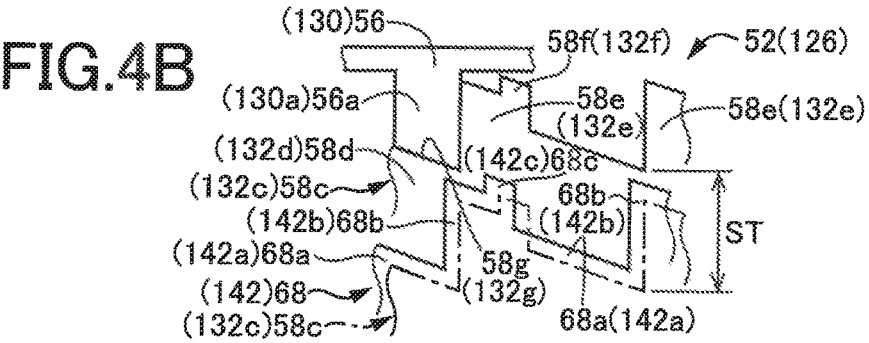
Figure 4C:
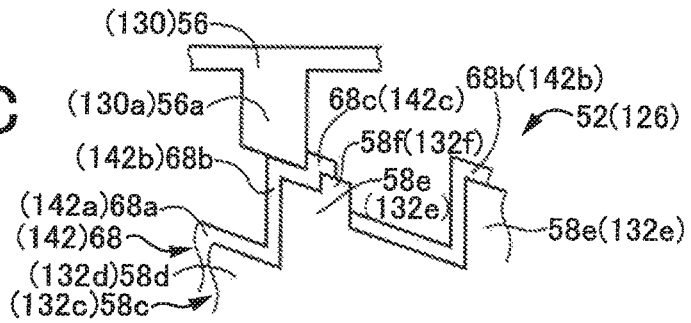
Figure 4D:
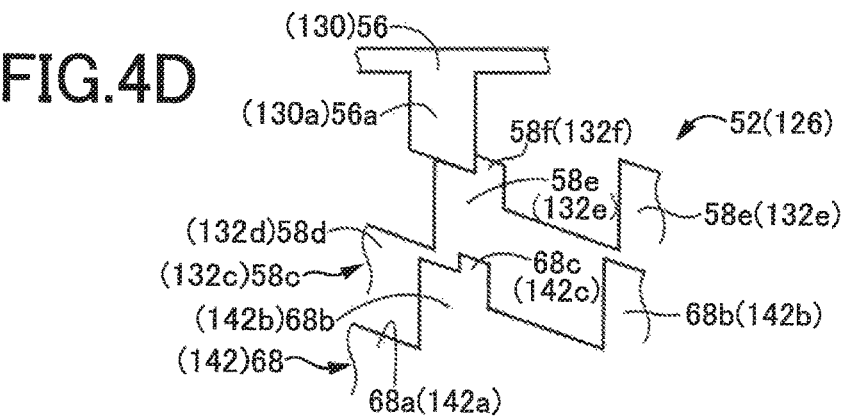
Figure 4E:
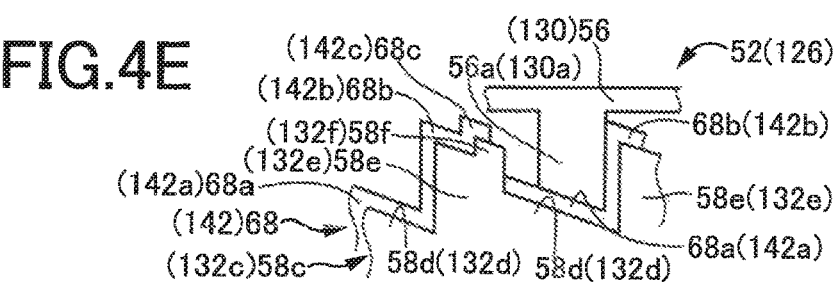

In FIGS. 4A and 4E, the projection 56a of the first piston 56 is latched on the first latching teeth 68a of the first holder 68, and the first connecting/disconnecting sleeve 48 is located at the first meshing position. As shown in FIGS. 4A and 4E, in a state in which the protrusion 56a projected from the first piston 56 is positioned at the position of latching on the first latching teeth 68a of the first holder 68, the pressing portion 58c of the first cam member 58 is positioned at a base position thereof. In a state shown in FIG. 4B, due to the activation of the first electromagnetic actuator 54 according to the supply of the first drive current I1 to the first electromagnetic coil 72, the first ball cam 64 is driven so that the first piston 56 is moved by a movement stroke ST from the base position against the urging forces of the first return spring 50 and the second return spring 66. In this process, the first piston 56 is moved by the pressing portion 58c of the first cam member 58 and is separated from the first holder 68, and the first piston 56 slips down a slope 58g of the first receiving tooth 58d of the pressing portion 58c in the first cam member 58. A dashed-dotted line shown in FIG. 4B indicates the base position of the pressing portion 58c in the first cam member 58 of FIG. 4A for explaining the movement stroke ST. In a state shown in FIG. 4C, due to the deactivation of the first electromagnetic actuator 54 according to the absence of the supply of the first drive current I1 to the first electromagnetic coil 72, the first ball cam 64 is not driven so that the pressing portion 58c of the first cam member 58 is returned by the movement stroke ST due to the urging forces of the first return spring 50 and the second return spring 66 and is positioned at the base position. In this process, the projection 56a of the first piston 56 is latched on the second latching teeth 68b of the first holder 68, and the first connecting/disconnecting sleeve 48 is positioned at the first non-meshing position. In a state shown in FIG. 4D, since the first ball cam 64 is driven due to the supply of the first drive current I1 to the first electromagnetic coil 72, the pressing portion 58c of the first cam member 58 is moved again by the movement stroke ST from the base position against the urging forces of the first return spring 50 and the second return spring 66. In this process, the first piston 56 is further moved toward the first return spring 50 and the first connecting/disconnecting sleeve 48 is moved toward the first bearing 44 beyond the first non-meshing position, so that the rotation speed of the first ring gear 38 and the rotation speed of the first connecting/disconnecting sleeve 48, i.e., the input shaft 34, are synchronized by the first synchronizing device 70. Subsequently, as shown in FIG. 4E, since the first ball cam 64 is not driven due to the absence of the supply of the first drive current I1 to the first electromagnetic coil 72, the pressing portion 58c of the first cam member 58 is returned by the movement stroke ST due to the urging force of the second return spring 66 and positioned at the base position, so that the projection 56a of the first piston 56 is latched on the first latching tooth 68a of the first holder 68 and the first connecting/disconnecting sleeve 48 is positioned at the first meshing position.

Figure 3:
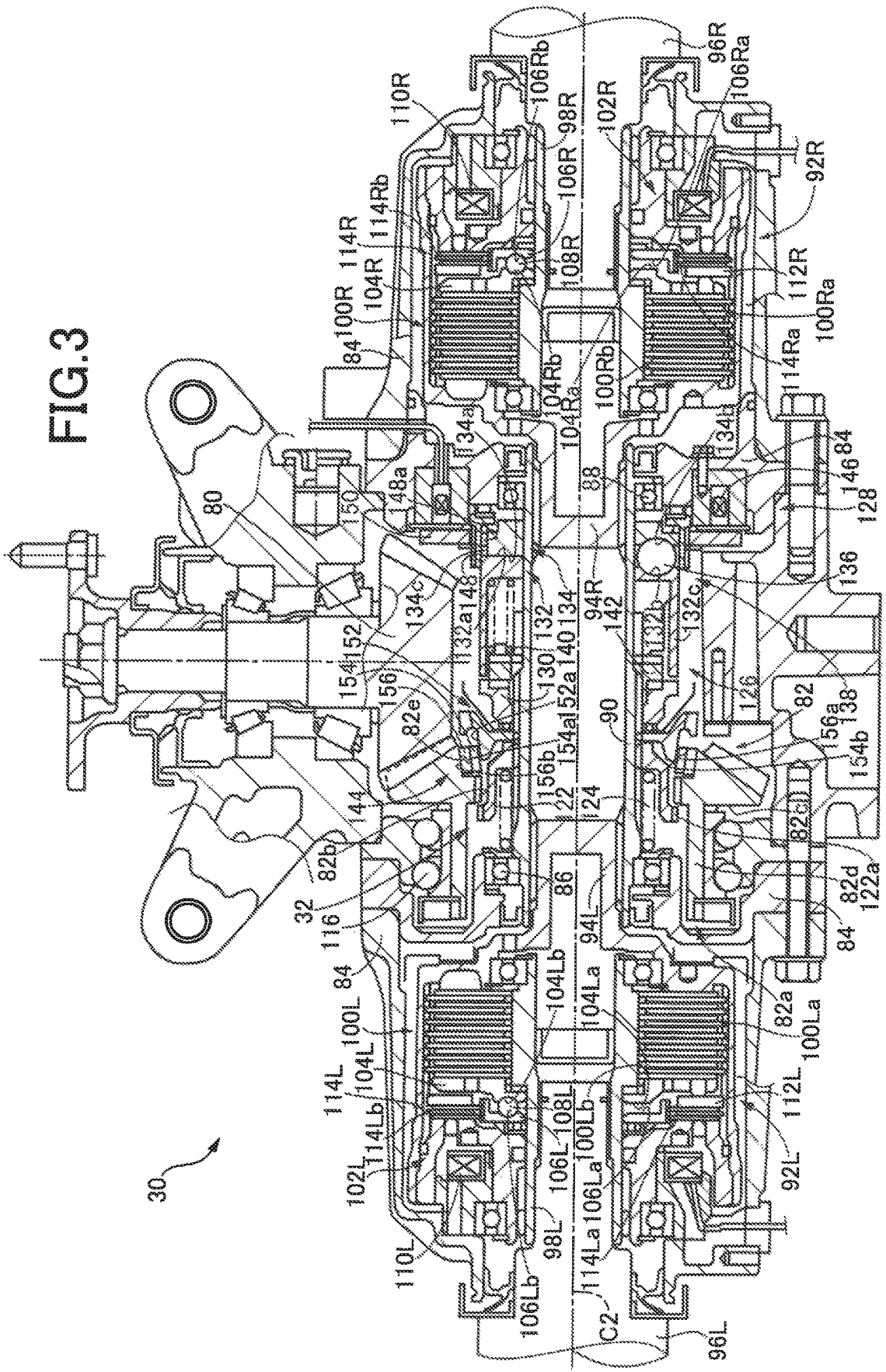
FIG. 3 is a cross-sectional view for explaining a configuration of a rear-wheel drive-power distributing device disposed on the four-wheel-drive vehicle of FIG. 1.

As shown in FIGS. 1 and 3, the rear-wheel drive-power distributing device 30 includes, in the power transmission path from the propeller shaft 28 to the left and right rear wheels 16L, 16R: a second ring gear 82 meshed with a drive pinion 80 coupled to the end portion of the propeller shaft 28 on the side of the rear wheels 16L, 16R; a cylindrical output shaft 90 supported rotatably around a second rotation axis (rotation axis) C2 via a first bearing 86 and a second bearing 88 by a unit case 84 of the rear-wheel drive-power distributing device 30; a pair of a left electronic control coupling (electronic control coupling) 92L and a right electronic control coupling (electronic control coupling) 92R respectively transmitting to the left and right rear wheels 16L, 16R a torque output from the output shaft 90 toward the rear wheels 16L, 16R; and the second clutch 32 connecting/disconnecting a power transmission path between the second ring gear 82 and the output shaft 90.

As shown in FIG. 3, the left electronic control coupling 92L includes a clutch drum (input-side rotating member) 94L spline-fitted with the output shaft 90, a clutch hub (output-side rotating member) 98L spline-fitted with a left rear-wheel axle 96L, a main friction engagement element 100L disposed between the clutch drum 94L and the clutch hub 98L, and a pressing mechanism 102L for pressing the main friction engagement element 100L.

As shown in FIG. 3, the main friction engagement element 100L includes a plurality of outer friction plates 100La fitted relatively non-rotatably and movably in the second rotation axis C2 direction with respect to the clutch drum 94L, and a plurality of inner friction plates 100Lb fitted relatively non-rotatably and movably in the second rotation axis C2 direction with respect to the clutch hub 98L, and the outer friction plates 100La and the inner friction plates 100Lb are alternately stacked in the second rotation axis C2 direction.

As shown in FIG. 3, the pressing mechanism 102L includes: an annular first cam member 104L functioning as a piston pressing the main friction engagement element 100L; an annular second cam member 106L disposed relatively rotatably with respect to the clutch hub 98L; a plurality of spherical rolling elements 108L sandwiched between groove-shaped cam surfaces 104Lb, 106Lb respectively formed on facing surfaces 104La, 106La of a pair of the first cam member 104L and the second cam member 106L; an annular left electromagnetic coil 110L integrally fixed to the unit case 84; an annular movable piece 112L disposed at a position adjacent to the left electromagnetic coil 110L via an auxiliary friction engagement element 114L described later and fitted to the clutch drum 94L relatively non-rotatably and movably in the second rotation axis C2 direction with respect to the clutch drum 94L; and the auxiliary friction engagement element 114L disposed between the left electromagnetic coil 110L and the movable piece 112L and provided on the outer circumferential side of the second cam member 106L. The first cam member 104L is fitted to the clutch hub 98L relatively non-rotatably and movably in the second rotation axis C2 direction with respect to the clutch hub 98L. The auxiliary friction engagement element 114L includes a pair of inner friction plates 114La fitted to the second cam member 106L relatively non-rotatably and movably in the second rotation axis C2 direction with respect to the second cam member 106L, and an outer friction plate 114Lb disposed between the paired inner friction plates 114La and fitted relatively non-rotatably and movably in the second rotation axis C2 direction with respect to the clutch drum 94L.

In the left electronic control coupling 92L configured as described above, if a third drive current (drive current) I3 is not supplied from the electronic control device 78 to the left electromagnetic coil 110L, since the first cam member 104L and the second cam member 106L rotate together with the rear wheel 16L and the first cam member 104L does not press the main friction engagement element 100L, no power is transmitted from the clutch drum 94L to the clutch hub 98L so that the power from the engine 12 is not transmitted to the rear wheel 16L.

If the third drive current I3 is supplied from the electronic control device 78 to the left electromagnetic coil 110L, since the movable piece 112L is attracted to the left electromagnetic coil 110L and the movable piece 112L presses the auxiliary friction engagement element 114L, a braking torque is generated in the second cam member 106L so that the first cam member 104L and the second cam member 106L relatively rotate. As a result, since the first cam member 104L presses the main friction engagement element 100L, the power of the clutch drum 94L is transmitted through the main friction engagement element 100L to the clutch hub 98L. As the third drive current I3 supplied from the electronic control device 78 to the left electromagnetic coil 110L becomes larger, the movable piece 112L is attracted by a larger force to the left electromagnetic coil 110L, and the force of the first cam member 104L pressing the main friction engagement element 100L becomes larger. Therefore, as the third drive current I3 supplied from the electronic control device 78 to the left electromagnetic coil 110L becomes larger, a larger power is transmitted from the clutch drum 94L through the main friction engagement element 100L to the clutch hub 98L, i.e., a larger transmission torque T1 (Nm) is transmitted from the clutch drum 94L to the clutch hub 98L. Thus, the left electronic control coupling 92L changes the transmission torque T1 (Nm) transmitted from the clutch drum 94L to the clutch hub 98L according to the third drive current I3 (mA) supplied from the electronic control device 78.

As shown in FIG. 3, the right electronic control coupling 92R includes a clutch drum (input-side rotating member) 94R spline-fitted with the output shaft 90, a clutch hub (output-side rotating member) 98R spline-fitted with a right rear-wheel axle 96R, a main friction engagement element 100R disposed between the clutch drum 94R and the clutch hub 98R, and a pressing mechanism 102R for pressing the main friction engagement element 100R.

As shown in FIG. 3, the main friction engagement element 100R includes a plurality of outer friction plates 100Ra fitted relatively non-rotatably and movably in the second rotation axis C2 direction with respect to the clutch drum 94R, and a plurality of inner friction plates 100Rb fitted relatively non-rotatably and movably in the second rotation axis C2 direction with respect to the clutch hub 98R, and the outer friction plates 100Ra and the inner friction plates 100Rb are alternately stacked in the second rotation axis C2 direction.

As shown in FIG. 3, the pressing mechanism 102R includes: an annular first cam member 104R functioning as a piston pressing the main friction engagement element 100R; an annular second cam member 106R disposed relatively rotatably with respect to the clutch hub 98R; a plurality of spherical rolling elements 108R sandwiched between groove-shaped cam surfaces 104Rb, 106Rb respectively formed on facing surfaces 104Ra, 106Ra of a pair of the first cam member 104R and the second cam member 106R; an annular right electromagnetic coil 110R integrally fixed to the unit case 84; an annular movable piece 112R disposed via an auxiliary friction engagement element 114R described later at a position adjacent to the right electromagnetic coil 110R and fitted to the clutch drum 94R relatively non-rotatably and movably in the second rotation axis C2 direction with respect to the clutch drum 94R; and the auxiliary friction engagement element 114R disposed between the right electromagnetic coil 110R and the movable piece 112R and provided on the outer circumferential side of the second cam member 106R. The first cam member 104R is fitted to the clutch hub 98R relatively non-rotatably and movably in the second rotation axis C2 direction with respect to the clutch hub 98R. The auxiliary friction engagement element 114R includes a pair of inner friction plates 114Ra fitted to the second cam member 106R relatively non-rotatably and movably in the second rotation axis C2 direction with respect to the second cam member 106R, and an outer friction plate 114Rb disposed between the paired inner friction plates 114Ra and fitted relatively non-rotatably and movably in the second rotation axis C2 direction with respect to the clutch drum 94R.

In the right electronic control coupling 92R configured as described above, if a fourth drive current (drive current) I4 is not supplied from the electronic control device 78 to the right electromagnetic coil 110R, since the first cam member 104R and the second cam member 106R rotate together with the rear wheel 16R and the first cam member 104R does not press the main friction engagement element 100R, no power is transmitted from the clutch drum 94R to the clutch hub 98R so that the power from the engine 12 is not transmitted to the rear wheel 16R.

If the fourth drive current I4 is supplied from the electronic control device 78 to the right electromagnetic coil 110R, since the movable piece 112R is attracted to the right electromagnetic coil 110R and the movable piece 112R presses the auxiliary friction engagement element 114R, a braking torque is generated in the second cam member 106R so that the first cam member 104R and the second cam member 106R relatively rotate. As a result, since the first cam member 104R presses the main friction engagement element 100R, the power of the clutch drum 94R is transmitted through the main friction engagement element 100R to the clutch hub 98R. As the fourth drive current I4 supplied from the electronic control device 78 to the right electromagnetic coil 110R becomes larger, the movable piece 112R is attracted by a larger force to the right electromagnetic coil 110R, and the force of the first cam member 104R pressing the main friction engagement element 100R becomes larger. Therefore, as the fourth drive current I4 (mA) supplied from the electronic control device 78 to the right electromagnetic coil 110R becomes larger, a larger power is transmitted from the clutch drum 94R through the main friction engagement element 100R to the clutch hub 98R, i.e., a larger transmission torque T2 (Nm) is transmitted from the clutch drum 94R to the clutch hub 98R. Thus, the right electronic control coupling 92R changes the transmission torque T2 (Nm) transmitted from the clutch drum 94R to the clutch hub 98R according to the fourth drive current I4 (mA) supplied from the electronic control device 78.

As shown in FIG. 3, the second ring gear 82 is a bevel gear having helical teeth or a hypoid gear formed thereon, for example. The second ring gear 82 is integrally provided with a substantially cylindrically-shaped cylindrical portion 82a formed on a radially inner side of the second ring gear 82 and second inner-circumferential connecting/disconnecting teeth (first connecting/disconnecting teeth) 82b formed on a radially inner side of an end portion of the cylindrical portion 82a on the rear wheel 16R side. The cylindrical portion 82a is provided with a shaft portion 82d projected in a substantially cylindrical shape from a side surface 82c of the second ring gear 82 toward the rear wheel 16L, and the shaft portion 82d is supported by the unit case 84 via a bearing 116. Therefore, the second ring gear 82 is supported rotatably around the second rotation axis C2 by the unit case 84 via the bearing 116 in a cantilevered manner.

As shown in FIG. 3, the output shaft 90 penetrates the inside of the cylindrical portion 82a of the second ring gear 82 such that a portion of the output shaft 90 is disposed inside the cylindrical portion 82a of the second ring gear 82. Both end portions of the output shaft 90 are supported by the unit case 84 via the first bearing 86 and the second bearing 88 respectively, so that the output shaft 90 is supported rotatably around the second rotation axis C2, i.e., rotatably concentrically with the second ring gear 82.

As shown in FIG. 3, the second clutch 32 includes: a second connecting/disconnecting sleeve connecting/disconnecting sleeve) 122 having second outer-circumferential connecting/disconnecting teeth (second connecting/disconnecting teeth) 122a that can be meshed with the second inner-circumferential connecting/disconnecting teeth 82b formed on the second ring gear 82, disposed relatively non-rotatably and movably in the second rotation axis C2 direction with respect to the output shaft 90, and moved between a second meshing position (meshing position) grid a second non-meshing position (non-meshing position); a coil-shaped first return spring (return spring) 124 urging the second connecting/disconnecting sleeve 122 from the second non-meshing position toward the second meshing position; a second movement mechanism 126 moving the second connecting/disconnecting sleeve 122 in the second rotation axis C2 direction to move the second connecting/disconnecting sleeve 122 between the second meshing position and the second non-meshing position; and a second electromagnetic actuator (electromagnetic actuator) 128 driving the second movement mechanism 126. The second meshing position is a position to which the second connecting/disconnecting sleeve 122 is moved in the second rotation axis C2 direction by the second movement mechanism 126 so that the second outer-circumferential connecting/disconnecting teeth 122a of the second connecting/disconnecting sleeve 122 are meshed with the second inner-circumferential connecting/disconnecting teeth 82b of the second ring gear 82 and, at the second meshing position, the second ring gear 82 and the output shaft 90 cannot relatively rotate. The second non-meshing position is a position to which the second connecting/disconnecting sleeve 122 is moved in the second rotation axis C2 direction by the second movement mechanism 126 so that the second outer-circumferential connecting/disconnecting teeth 122a of the second connecting/disconnecting sleeve 122 are not meshed with the second inner-circumferential connecting/disconnecting teeth 82b of the second ring gear 82 and, at the second non-meshing position, the second ring gear 82 and the output shaft 90 can relatively rotate. The first return spring 124 is interposed between the first bearing 86 and the second connecting/disconnecting sleeve 122 in a preloaded state, and the second connecting/disconnecting sleeve 122 is urged by the first return spring 124 in the second rotation axis C2 direction toward the rear wheel 16R.

As shown in FIG. 3, the second movement mechanism 126 includes a second piston (piston) 130, a second ball cam (ball cam) 138, a second return spring 140, and a second holder (holder) 142. The second piston 130 is disposed relatively rotatably around the second rotation axis C2 with respect to the output shaft 90 to move the second connecting/disconnecting sleeve 122 to the second non-meshing position against the urging force of the first return spring 124. The second ball cam 138 has a pair of annular first cam member (cam member) 132 and second cam member (cam member) 134 relatively rotated around the second rotation axis C2 by the operation of the second electromagnetic actuator 128 and a second spherical rolling element (spherical rolling element) 136 which is put between groove-shaped cam surfaces 132b, 134b respectively formed on facing surfaces 132a, 134a of the first cam member 132 and the second cam member 134 which face each other so that when the pair of the first cam member 132 and the second cam member 134 is relatively rotated around the second rotation axis C2, the first cam member 132 is moved toward the second piston 130. The second return spring 140 urges the first cam member 132 toward the second cam member 134. And, the second holder 142 has first latching teeth (latching teeth) 142a (see FIGS. 4A to 4E) and second latching teeth (latching teeth) 142b (see FIGS. 4A to 4E) at multiple levels (in this example, two levels) and is disposed relatively non-rotatably around the second rotation axis C2 and non-movably in the second rotation axis C2 direction with respect to the output shaft 90 to latch the second piston 130 with the first latching teeth 142a or the second latching teeth 142b so as to position the second connecting/disconnecting sleeve 122 at the second meshing position or the second non-meshing position. The second movement mechanism 126 has a second synchronizing device 144 disposed between the second connecting/disconnecting sleeve 122 and the second piston 130 to synchronize the rotation (rotation speed) of the output shaft 90, i.e., the second connecting/disconnecting sleeve 122, and the rotation (rotation speed) of the second ring gear 82 when the second connecting/disconnecting sleeve 122 moves from the second non-meshing position to the second meshing position.

As shown in FIG. 3, the second electromagnetic actuator 128 includes an annular second electromagnetic coil 146 integrally fixed to the unit case 84, an annular member 148 rotatably supported around the second rotation axis C2 with respect to the unit case 84, and an annular second movable piece 150 disposed on the outer circumferential side of the annular member 148 adjacently to the second electromagnetic coil 146. The second movable piece 150 is disposed relatively non-rotatably with respect to the annular member 148 and movably in the second rotation axis C2 direction relative to the annular member 148. On an inner circumference of the annular member 148, inner-circumferential spline teeth 148a meshed with outer-circumferential spline teeth 134c formed on an outer circumference of the second cam member 134 are formed relatively non-rotatably and movably in the second rotation axis C2 direction with respect to the second cam member 134. Although not shown, on an inner circumferential surface of the first cam member 132, inner-circumferential meshing teeth meshed with outer-circumferential spline teeth formed on the output shaft 90 are formed such that the first cam member 132 is made relatively non-rotatable and movable in the second rotation axis C2 direction with respect to the output shaft 90.

In the second electromagnetic actuator 128 configured as described above, for example, when the second movable piece 150 is attracted to the second electromagnetic coil 146 due to a second drive current I2 (see FIG. 1) supplied from the electronic control device 78 to the second electromagnetic coil 146 while the vehicle is running and the output shaft 90 is rotating around the second rotation axis C2, the second movable piece 150 is attracted to the second electromagnetic coil 146 integrally fixed to the unit case 84 that is a non-rotating member, and a braking torque Ts (Nm) is thereby applied to the second cam member 134 via the annular member 148. Therefore, when the braking torque Ts is applied to the second cam member 134 by the second electromagnetic actuator 128, the relative rotation between the first cam member 132 and the second cam member 134 moves the first cam member 132 toward the second piston 130 against the urging forces of the first return spring 124 and the second return spring 140 in the second rotation axis C2 direction via the second spherical rolling element 136, and moves the second connecting/disconnecting sleeve 122 toward the rear wheel 16L, via the second piston 130 etc. When the braking torque Ts is applied to the second cam member 134 of the second ball cam 138 by the second electromagnetic actuator 128, the braking torque Ts is applied to the clutch drums 94L, 94R coupled to the output shaft 90 via the second spherical rolling element 136 of the second ball cam 138 and the first cam member 132. When the second electromagnetic actuator 128 is deactivated from an activated state by the electronic control device 78, i.e. when the supply of the second drive current I2 is stopped in the state in which the second drive current I2 is supplied from the electronic control device 78 to the second electromagnetic coil 146, the second connecting/disconnecting sleeve 122 is moved toward the rear wheel 16R by the urging force of the first return spring 124, and the first cam member 132 is moved in the direction toward the second cam member 134 by the urging force of the second return spring 140.

FIGS. 4A to 4E are schematic views for explaining also an operation principle of the second movement mechanism 126 and shows a state in which the annular second piston 130, a pressing portion 132c formed on the annular first cam member 132, and the annular second holder 142 are each developed. As shown in FIGS. 4A to 4E, the annular second piston 130 is provided with a projection 130a projected toward the second holder 142. The annular second holder 142 has the first latching teeth 142a and the second latching teeth 142b periodically formed into a saw tooth shape and arranged in the circumferential direction for latching the projection 130a of the second piston 130, and the second holder 142 is disposed at a fixed position on the output shaft 90. The pressing portion 132c of the annular first cam member 132 has two levels of first receiving teeth 132d and second receiving teeth 132e periodically formed into the saw tooth shape similar to the first latching teeth 142a and the second latching teeth 142b of the second holder 142 and arranged in the circumferential direction in a shape shifted by a predetermined phase to receive the projection 130a of the second piston 130. The pressing portion 132c of the annular first cam member 132 is disposed relatively non-rotatably and movably in the second rotation axis C2 direction with respect to the second holder 142, and can move the second piston 130 by one stroke of the second ball cam 138 against the urging forces of the first return spring 124 and the second return spring 140. Slopes at tips of the second receiving teeth 132e of the pressing portion 132c of the first cam member 132 and the second latching teeth 142b of the second holder 142 are respectively provided with stoppers 132f and 142e stopping a slip of the projection 130a of the second piston 130.

In FIGS. 4A and 4E, the projection 130a of the second piston 130 is latched on the first latching teeth 142a of the second holder 142, and the second connecting/disconnecting sleeve 122 is located at the second meshing position. As shown in FIGS. 4A and 4E, in a state in which the protrusion 130a projected from the second piston 130 is positioned at the position of latching on the first latching teeth 142a of the second holder 142, the pressing portion 132c of the first cam member 132 is positioned at a base position thereof. In a state shown in FIG. 4B, due to the activation of the second electromagnetic actuator 128 by the supply of the second drive current I2 to the second electromagnetic coil 146, the second ball cam 138 is driven so that the second piston 130 is moved by the movement stroke ST from the base position against the urging forces of the first return spring 124 and the second return spring 140. In this process, the second piston 130 is moved by the pressing portion 132c of the first cam member 132 and is separated from the second holder 142, and the second piston 130 slips down a slope 132g of the first receiving tooth 132d of the pressing portion 132c in the first cam member 132. The dashed-dotted line shown in FIG. 4B indicates the base position of the pressing portion 132c in the first cam member 132 of FIG. 4A for explaining the movement stroke ST. In a state shown in FIG. 4C, due to the deactivation of the second electromagnetic actuator 128 according to the absence of the supply of the second drive current I2 to the second electromagnetic coil 146, the second ball cam 138 is not driven so that the pressing portion 132c of the first cam member 132 is returned by the movement stroke ST due to the urging forces of the first return spring 124 and the second return spring 140 and is positioned at the base position. In this process, the projection 130a of the second piston 130 is latched on the second latching teeth 142b of the second holder 142, and the second connecting/disconnecting sleeve 122 is positioned at the second non-meshing position. In a state shown in FIG. 4D, since the second ball cam 138 is driven due to the supply of the second drive current I2 to the second electromagnetic coil 146, the pressing portion 132c of the first cam member 132 is moved again by the movement stroke ST from the base position against the urging forces of the first return spring 124 and the second return spring 140. In this process, the second piston 130 is further moved toward the first return spring 124 and the second connecting/disconnecting sleeve 122 is moved toward the first bearing 86 beyond the second non-meshing position, so that the rotation speed of the second ring gear 82 and the rotation speed of the second connecting/disconnecting sleeve 122, i.e., the output shaft 90, are synchronized by the second synchronizing device 144. Subsequently, as shown in FIG. 4E, since the second ball cam 138 is not driven due to the absence of the supply of the second drive current I2 to the second electromagnetic coil 146, the pressing portion 132c of the first cam member 132 is returned by the movement stroke ST due to the urging force of the second return spring 140 and positioned at the base position, so that the projection 130a of the second piston 130 is latched on the first latching tooth 142a of the second holder 142 and the second connecting/disconnecting sleeve 122 is positioned at the second meshing position.

In the second clutch 32 configured as described above, for example, in a state in which the second connecting/disconnecting sleeve 122 is positioned at the second meshing position, when the first cam member 132 and the second cam member 134 are relatively rotated through the operation of applying the braking torque Ts to the second cam member 134 of the second ball cam 138 by the second electromagnetic actuator 128, i.e., the operation of the second electromagnetic actuator 128 applying the braking torque Ts via the second ball cam 138 and the output shaft 90 to the clutch drums 94L, 94R, the second piston 130 is reciprocated once by the first cam member 132 and the second connecting/disconnecting sleeve 122 is positioned at the second non-meshing position. In the left electronic control coupling 92L and the right electronic control coupling 92R, for example, when the transmission torques T1, T2 transmitted from the clutch drums 94L, 94R to the clutch hubs 98L, 98R are zero (Nm) and the second connecting/disconnecting sleeve 122 of the second clutch 32 is positioned at the second non-meshing position by the operation of the second electromagnetic actuator 128, the second ring gear 82 and the output shaft 90 are disconnected from each other by the second clutch 32 in the power transmission path between the engine 12, i.e., the propeller shaft 28, and the rear wheels 16L, 16R, so that the input of the power from the engine 12 to the clutch drums 94L, 94R and the output shaft 90 is interrupted. Therefore, the second clutch 32 selectively connects/disconnects the input of the power from the engine 12 to the clutch drums 94L, 94R of the left electronic control coupling 92L and the right electronic control coupling 92R according to the operation of the second electromagnetic actuator 128.

As shown in FIG. 3, the second synchronizing device 144 includes an annular member having annularly-shape 152 interposed between the second connecting/disconnecting sleeve 122 and the second piston 130, and a pair of annular first friction engagement member 154 and second friction engagement member 156 respectively disposed between a conical outer-circumferential friction surface 152a formed on the outer circumference of the annular member 152 and slightly inclined relative to the second rotation axis C2 and a conical inner-circumferential abutting surface 82e formed on the inner circumference of the end portion of the second ring gear 82 on the second piston 130 side and slightly inclined relative to the second rotation axis C2. The annular member 152 is disposed relatively non-rotatably and movably in the second rotation axis C2 direction with respect to the output shaft 90. Since a portion of the annular member 152 is sandwiched between the second connecting/disconnecting sleeve 122 and the second piston 130 by the urging force of the first return spring 124, the annular member 152 moves in the second rotation axis C2 direction in conjunction with the movement of the second connecting/disconnecting sleeve 122 and the second piston 130 in the second rotation axis C2 direction. The first friction engagement member 154 is provided with a first conical outer-circumferential friction surface 154a formed on an inner-circumferential surface of the second friction engagement member 156 and slidably contacting with the second conical inner-circumferential friction surface 156a slightly inclined relative to the second rotation axis C2, and a first conical inner-circumferential friction surface 154b slidably contacting with the conical outer-circumferential friction surface 152a of the annular member 152. The second friction engagement member 156 is provided with the second conical inner-circumferential friction surface 156a and a second conical outer-circumferential abutting surface 156b capable of abutting on the conical inner-circumferential abutting surface 82e of the second ring gear 82.

Therefore, in the case that the second connecting/disconnecting sleeve 122 is at the second non-meshing position and the second piston 130 is reciprocated once by the first cam member 132, when the first cam member 132 moves forward and the second connecting/disconnecting sleeve 122 is moved beyond the second non-meshing position, the second conical outer-circumferential abutting surface 156b of the second friction engagement member 156 abuts on the conical inner-circumferential abutting surface 82e of the second ring gear 82 and the conical outer-circumferential friction surface 152a of the annular member 152 presses the conical inner-circumferential abutting surface 82e of the second ring gear 82 via the first friction engagement member 154 and the second friction engagement member 156, so that a synchronizing operation is performed to synchronize the rotation speed of the output shaft 90 having the annular member 152 relatively non-rotatable disposed thereon and the rotation speed of the second ring gear 82. When the first cam member 132 moves backward (returns to its initial position), the second conical outer-circumferential abutting surface 156b of the second friction engagement member 156 is separated from the conical inner-circumferential abutting surface 82e of the second ring gear 82, so that the synchronizing operation is stopped.

Figure 5:
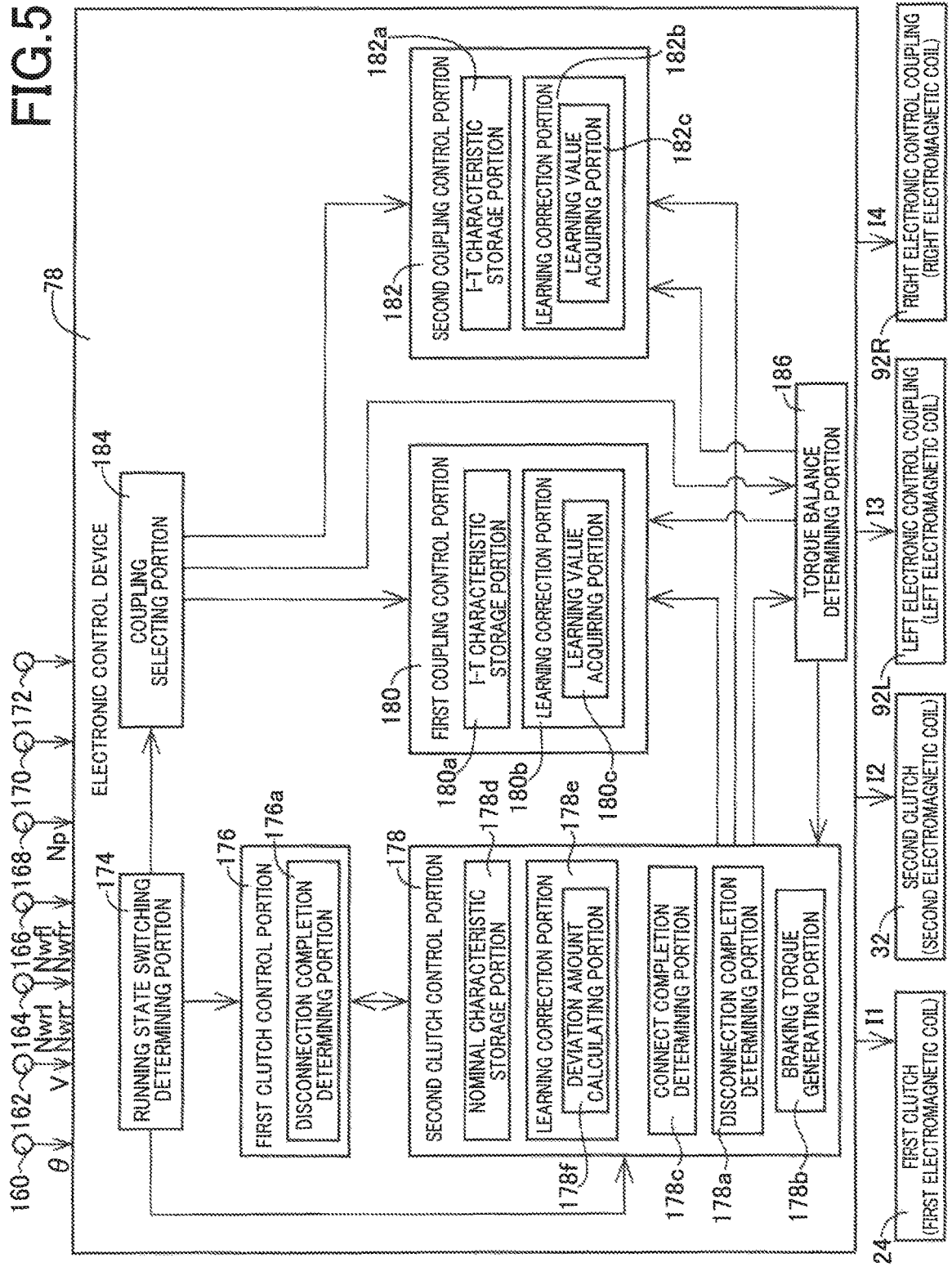
FIG. 5 is a functional block diagram for explaining a main portion of the control function included in an electronic control device disposed on the four-wheel-drive vehicle of FIG. 1.

FIG. 5 is a functional block diagram for explaining a main portion of the control function included in the electronic control device 78 disposed on the four-wheel-drive vehicle 10 of FIG. 1. As shown in FIG. 5, the electronic control device 78 is supplied with various input signals detected by sensors disposed on the four-wheel-drive vehicle 10. For example, signals input to the electronic control device 78 include a signal indicative of a steering angle θ detected by a steering sensor 160, a signal indicative of a vehicle speed V (km/h) detected by a vehicle speed sensor 162, a signal indicative of rotation speeds Nwrl, Nwrr (rpm) of the rear wheels 16l, 16R detected by a first rotation speed sensor 164, a signal indicative of rotation speeds Nwfl, Nwfr (rpm) of the front wheels 14L, 14R detected by a second rotation speed sensor 166, a signal indicative of a rotation speed Np (rpm) of the propeller shaft 28 detected by a third rotation speed sensor 168, ON/OFF signals indicative of whether the first connecting/disconnecting sleeve 48 is positioned at the first meshing position, detected by a first position sensor 170, and ON/OFF signals indicative of whether the second connecting/disconnecting sleeve 122 is positioned at the second meshing position, detected by a second position sensor 172.

Various output signals are supplied from the electronic control device 78 to the devices or portions disposed on the four-wheel-drive vehicle 10. For example, signals supplied from the electronic control device 78 to the portions include the first drive current I1 (mA) supplied to the first electromagnetic coil 72 of the first electromagnetic actuator 54 so as to move the first connecting/disconnecting sleeve 48 in the first rotation axis C1 direction in the first clutch 24, a second drive current I2 (first drive current) (mA) supplied to the second electromagnetic coil 146 of the second electromagnetic actuator 128 so as to move the second connecting/ disconnecting sleeve 122 in the second rotation axis C2 direction in the second clutch 32, the third drive current (drive current) I3 (mA) supplied to the left electromagnetic coil 110L of the pressing mechanism 102L so as to control the transmission torque T1 (Nm) transmitted from the clutch drum 94L to the clutch hub 98L in the left electronic control coupling 92L, and the fourth drive current (drive current) I4 (mA) supplied to the right electromagnetic coil 110R of the pressing mechanism 102R so as to control the transmission torque T2 (Nm) transmitted from the clutch drum 94R to the clutch hub 98R in the right electronic control coupling 92R.

A running state switching determining portion 174 shown in FIG. 5 determines whether switching is performed from a two-wheel-drive running mode for performing two-wheel drive in which the drive power is transmitted from the engine 12 only to the left and right front wheels 14L, 14R, to a four-wheel-drive running mode for performing four-wheel drive in which the drive power is transmitted from the engine 12 to the left and right rear wheels 16L, 16R in addition to the left and right front wheels 14L, 14R. For example, when a 4WD switching permission condition is satisfied during running of the vehicle based on an automatic determination or a manual operation, the running state switching determining portion 174 determines that switching is performed from the two-wheel-drive running mode to the four-wheel-drive running mode.

The running state switching determining portion 174 also determines whether switching is performed from the four-wheel-drive running mode to the two wheel-drive running mode. For example, when a 2WD switching permission condition is satisfied during running of the vehicle based on an automatic determination or a manual operation, the running state switching determining portion 174 determines that switching is performed from the four-wheel-drive running mode to the two-wheel-drive running mode.

When the running state switching determining portion 174 determines that switching is performed from the four-wheel-drive running mode to the two wheel-drive running mode, a first clutch control portion 176 supplies the first drive current I1 for a predetermined time to the first electromagnetic coil 72 of the first electromagnetic actuator 54 so as to move the first connecting/disconnecting sleeve 48 to the first non-meshing position to release (disconnect) the first clutch 24 if the first position sensor 170 detects that the first connecting/disconnecting sleeve 48 is positioned at the first meshing position. When the first drive current I1 is supplied for the predetermined time so that the first ball cam 64 is operated and the first piston 56 is reciprocated once by the first cam member 58, the first connecting/disconnecting sleeve 48 moves from the first meshing position to the first non-meshing position.

When the running state switching determining portion 174 determines that switching is performed from the four-wheel-drive running mode to the two-wheel-drive running mode, a disconnection completion determining portion 176a included in the first clutch control portion 176 determines whether the release (disconnection) of the first clutch 24 is completed. For example, when the first position sensor 170 detects that the first connecting/disconnecting sleeve 48 of the first clutch 24 is not positioned at the first meshing position, the disconnection completion determining portion 176a determines that the release of the first clutch 24 is completed.

When the running state switching determining portion 174 determines that switching is performed from the four-wheel-drive running mode to the two-wheel-drive running mode and the disconnection completion determining portion 176a determines that the release of the first clutch 24 is completed, a second clutch control portion 178 supplies the second drive current I2 for a predetermined time to the second electromagnetic coil 146 of the second electromagnetic actuator 128 so as to move the second connecting/ disconnecting sleeve 122 to the second non-meshing position to release (disconnect) the second clutch 32 if the second position sensor 172 detects that the second connecting/disconnecting sleeve 122 is positioned at the second meshing position. When the second drive current I2 is supplied for the predetermined time so that the second ball cam 138 is operated and the second piston 130 is reciprocated once by the first cam member 132, the second connecting/disconnecting sleeve 122 moves from the second meshing position to the second non-meshing position.

When the running state switching determining portion 174 determines that switching is performed from the four-wheel-drive running mode to the two-wheel-drive running mode and the disconnection completion determining portion 176a determines that the release of the first clutch 24 is completed, a disconnection completion determining portion 178a included in the second clutch control portion 178 determines whether the release (disconnection) of the second clutch 32 is completed. For example, when the second position sensor 172 detects that the second connecting/ disconnecting sleeve 122 of the second clutch 32 is not positioned at the second meshing position, the disconnection completion determining portion 178a determines that the release of the second clutch 32 is completed.

A first coupling control portion 180 supplies the third drive current I3 (mA) to the left electromagnetic coil 110L of the pressing mechanism 102L based on an I-T characteristic L (see FIG. 6) stored in an I-T characteristic storage portion (storage portion) 180a described later and thereby controls the left electronic control coupling 92L so as to appropriately change the transmission torque T1 (Nm) transmitted from the clutch drum 94L to the clutch hub 98L of the left electronic control coupling 92L according to a running state of the vehicle during running of the vehicle.

Figure 6:
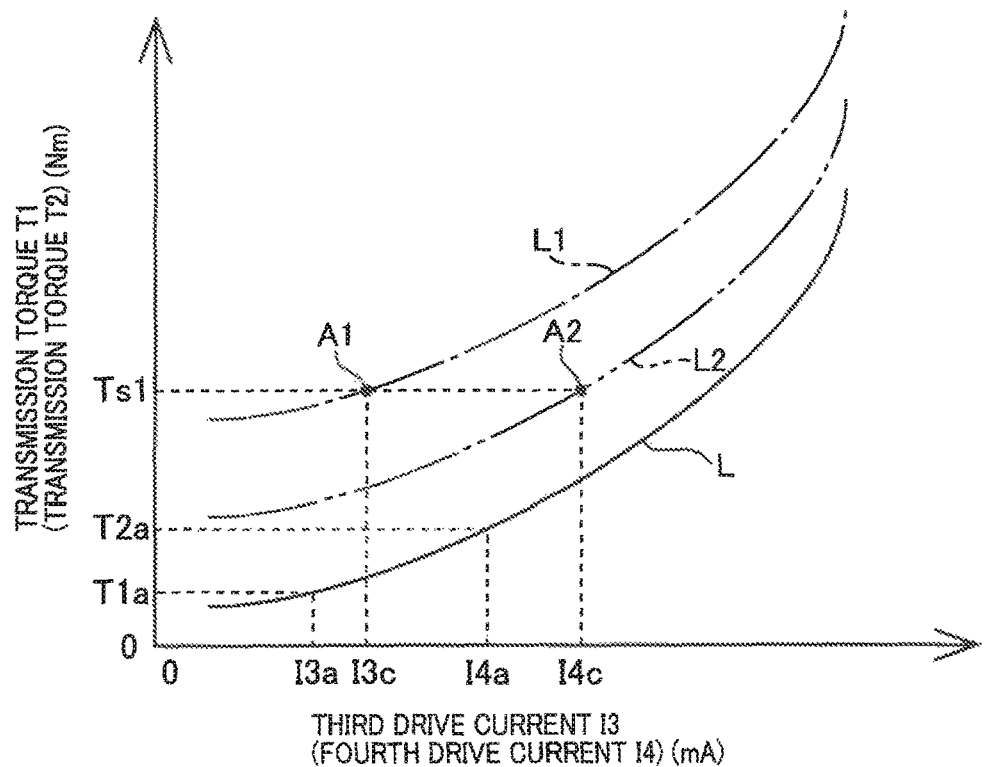
FIG. 6 is a diagram for explaining an example of a learning correction for an I-T characteristic indicative of a first relationship between a braking torque and a drive current with a learning value acquired by a learning-value acquiring portion in a learning correction portion provided in the electronic control device of FIG. 5.

For example, as shown in FIG. 6, the I-T characteristic storage portion 180a stores the I-T characteristic L indicative of a first relationship between the third drive current I3 (mA) supplied to the left electromagnetic coil 110L of the pressing mechanism 102L in the left electronic control coupling 92L and the transmission torque T1 (Nm) transmitted from the clutch drum 94L to the clutch hub 98L in the left electronic control coupling 92L. For example, to output a predetermined transmission torque T1a (Nm) to the left electronic control coupling 92L during running of the vehicle, the first coupling control portion 180 obtains a predetermined third drive current I3a (mA) by using the I-T characteristic L shown in FIG. 6, for example, and supplies the third drive current I3a (mA) to the left electromagnetic coil 110L.

A second coupling control portion 182 supplies the fourth drive current I4 (mA) to the right electromagnetic coil 110R of the pressing mechanism 102R based on an I-T characteristic L (see FIG. 6) stored in an I-T characteristic storage portion 182a described later and thereby controls the right electronic control coupling 92R so as to appropriately change the transmission torque T2 (Nm) transmitted from the clutch drum 94R to the clutch hub 98R of the right electronic control coupling 92R according to the running state of the vehicle during running of the vehicle.

For example, as shown in FIG. 6, the I-T characteristic storage portion 182a stores the I-T characteristic L indicative of a first relationship between the fourth drive current I4 (mA) supplied to the right electromagnetic coil 110R of the pressing mechanism 102R in the right electronic control coupling 92R and the transmission torque T2 (Nm) transmitted from the clutch drum 94R to the clutch hub 98R in the right electronic control coupling 92R. For example, to output a predetermined transmission torque T2a (Nm) to the right electronic control coupling 92R during running of the vehicle, the second coupling control portion 182 obtains a predetermined fourth drive current I4a (mA) by using the I-T characteristic L shown in FIG. 6, for example, and supplies the fourth drive current I4a (mA) to the right electromagnetic coil 110R.

When the running state switching determining portion 174 determines that switching is performed from the four-wheel-drive running mode to the two-wheel-drive running mode, a coupling selecting portion 184 selects whether correction through learning (hereinafter referred as learning correction) is performed for the I-T characteristic L stored in the I-T characteristic storage portion 180a of the first coupling control portion 180, i.e., the I-T characteristic L of the left electronic control coupling 92L, or learning correction is performed for the I-T characteristic L stored in the I-T characteristic storage portion 182a of the second coupling control portion 182, i.e., the I-T characteristic L of the right electronic control coupling 92R. For example, if selecting the learning correction for the I-T characteristic L of the left electronic control coupling 92L, the coupling selecting portion 184 selects the learning correction for the I-T characteristic L of the right electronic control coupling 92R when the running state switching determining portion 174 determines next time that switching is performed from the four-wheel-drive running mode to the two-wheel-drive running mode. Therefore, for example, each time the four-wheel-drive state is switched to the two-wheel-drive state, the coupling selecting portion 184 alternately switches the learning correction for the I-T characteristic L of the left electronic control coupling 92L and the learning correction for the I-T characteristic L of the right electronic control coupling 92R. Alternately, when the running state switching determining portion 174 determines that switching is performed from the four-wheel-drive running mode to the two-wheel-drive running mode, the coupling selecting portion 184 may perform the learning correction for the left electronic control coupling 92L, for example, and perform the learning correction for the right electronic control coupling 92R after completion of the learning correction for the left electronic control coupling 92L.

When the disconnection completion determining portion 178a determines that the release of the second clutch 32 is completed, and a preset first predetermined time t1c (sec) has elapsed after the determination, a braking torque generating portion 178b included in the second clutch control portion 178 controls the second drive current I2 (mA) supplied to the second electromagnetic coil 146 of the second electromagnetic actuator 128 so as to generate a predetermined braking torque Ts1 (Nm) set in advance in the clutch drum 94L of the left electronic control coupling 92L and the clutch drum 94R of the right electronic control coupling 92R, i.e., in the output shaft 90 until a third predetermined time t3c (sec) has elapsed after a torque balance determining portion 186 described later determines that the transmission torque T1 or T2 and the braking torque Ts1 is balanced. In the braking torque generating portion 178b, the magnitude of the braking torque Ts1 (Nm) is such a magnitude that the second ball cam 138 is operated to operate the second synchronizing device 144 by the second piston 130. When the disconnection completion determining portion 178a determines that the release of the second clutch 32 is completed, and the first predetermined time t1c (sec) has elapsed after the determination, the braking torque generating portion 178b generates the braking torque Ts1, and the first clutch 24 and the second clutch 32 are each released before the braking torque Ts1 is generated by the braking torque generating portion 178b.

When the disconnection completion determining portion 178a of the second clutch control portion 178 determines that the release of the second clutch 32 is completed, and the coupling selecting portion 184 selects the learning correction for the I-T characteristic L of the left electronic control coupling 92L, the second coupling control portion 182 controls the fourth drive current I4 (mA) supplied to the right electromagnetic coil 110R of the right electronic control coupling 92R such that the transmission torque T2 transmitted from the clutch drum 94R to the clutch hub 98R becomes zero (Nm) until the third predetermined time t3c (sec) has elapsed after the torque balance determining portion 186 described later determines that the transmission torque T1 and the braking torque Ts1 are balanced.

When the disconnection completion determining portion 178a of the second clutch control portion 178 determines that the release of the second clutch 32 is completed, and the coupling selecting portion 184 selects the learning correction for the I-T characteristic L of the left electronic control coupling 92L, the first coupling control portion 180 controls the third drive current I3 for the left electromagnetic coil 110L of the left electronic control coupling 92L such that the transmission torque T1 transmitted from the clutch drum 94L to the clutch hub 98L becomes zero (Nm) for a preset second predetermined time t2c (sec). When the second predetermined time t2c has elapsed, the first coupling control portion 180 controls the third drive current I3 supplied to the left electromagnetic coil 110L of the left electronic control coupling 92L such that the transmission torque T1 increases from a torque lower than the braking torque Ts1 generated by the braking torque generating portion 178b, i.e., the transmission torque T1 increases from zero (Nm), with a predetermined gradient. The second predetermined time t2c (sec) is preliminarily obtained from an experiment etc. as a time until the rotation speed of the output shaft 90, i.e., the rotation speed of the clutch drum 94L of the left electronic control coupling 92L, is reduced sufficiently lower than the rotation speed Nwrl of the rear wheel 16L, i.e., the rotation speed of the clutch hub 98L of the left electronic control coupling 92L by the braking torque Ts1 (Nm) generated by the braking torque generating portion 178b when both the transmission torque T1 of the left electronic control coupling 92L and the transmission torque T2 of the right electronic control coupling 92R are zero (Nm).

When the coupling selecting portion 184 selects the learning correction for the I-T characteristic L of the left electronic control coupling 92L, and the disconnection completion determining portion 178a of the second clutch control portion 178 determines that the release of the second clutch 32 is completed, and the second predetermined time t2c (sec) has elapsed after the determination, the torque balance determining portion 186 determines whether the transmission torque T1 (Nm) increased with a predetermined gradient by the first coupling control portion 180 is balanced with the predetermined braking torque Ts1 (Nm) applied to the clutch drum 94L of the left electronic control coupling 92L by the braking torque generating portion 178b. For example, when the rotation speed Np (rpm) of the propeller shaft 28 and the rotation speed Nwrl (rpm) of the rear wheel 16L are synchronized, i.e., when a difference falls within a predetermined range between the rotation speed Np (rpm) of the propeller shaft 28 and the rotation speed Nwrl (rpm) of the rear wheel 16L, the torque balance determining portion 186 determines that the transmission torque T1 (Nm) increased with a predetermined gradient by the first coupling control portion 180 is balanced with the braking torque Ts1 (Nm) applied to the clutch drum 94L of the left electronic control coupling 92L by the braking torque generating portion 178b. In the torque balance determining portion 186, since the rotation speed Np (rpm) of the propeller shaft 28 is detected by the third rotation speed sensor 168 after the second predetermined time t2c has elapsed from the determination of completion of the release of the second clutch 32 by the disconnection completion determining portion 178a of the second clutch control portion 178, i.e., after the braking torque Ts1 is applied to the second cam member 134 by the braking torque generating portion 178b and the second synchronizing device 144 is operated, the rotation speed Np (rpm) of the propeller shaft 28 is substantially the same as the rotation speed (rpm) of the output shaft 90, i.e., the clutch drum 94L, in terms of a converted value on the second rotation axis C2 due to the operation of the second synchronizing device 144. The rotation speed Nwrl (rpm) of the rear wheel 16L is the same as the rotation speed (rpm) of the clutch hub 98L.

When the coupling selecting portion 184 selects the learning correction for the I-T characteristic L of the left electronic control coupling 92L and the torque balance determining portion 186 determines that the transmission torque T1 (Nm) and the braking torque Ts1 (Nm) are balanced, a learning correction portion 180b included in the first coupling control portion 180 performs the learning correction for the I-T characteristic L stored in the I-T characteristic storage portion 180a with the braking torque Ts1 (Nm) and a third drive current I3c (mA), described later, acquired by a learning value acquiring portion 180c described later.

When the coupling selecting portion 184 selects the learning correction for the I-T characteristic L of the left electronic control coupling 92L and the torque balance determining portion 186 determines that the transmission torque T1 (Nm) and the braking torque Ts1 (Nm) are balanced, the learning value acquiring portion 180c acquires as a learning value A1 the predetermined third drive current I3c (mA) and the braking torque Ts1 (Nm) generated by the braking torque generating portion 178b when the torque balance determining portion 186 determines that the transmission torque T1 (Nm) and the braking torque Ts1 (Nm) are balanced, where the third drive current I3c is the current supplied to the left electromagnetic coil 110L of the left electronic control coupling 92L by the first coupling control portion 180.

When the coupling selecting portion 184 selects the learning correction for the I-T characteristic L of the left electronic control coupling 92L, and the torque balance determining portion 186 determines that the transmission torque T1 (Nm) and the braking torque Ts1 (Nm) are balanced, and the learning value acquiring portion 180c acquires the braking torque Ts1 (Nm) and the third drive current I3c (mA) as the learning value A1, the learning correction portion 180b of the first coupling control portion 180 performs the learning correction with the learning value A1 for the I-T characteristic L stored in the I-T characteristic storage portion 180a. For example, when the learning value A1 is acquired by the learning value acquiring portion 180c, as shown in FIG. 6, the learning correction portion 180b of the first coupling control portion 180 moves the I-T characteristic L in parallel with the axis indicative of the transmission torque T1 (Nm) such that the I-T characteristic L preliminarily stored in the I-T characteristic storage portion 180a passes through the learning value A1, for example. In FIG. 6, an I-T characteristic L1 indicated by a dashed-dotted line is the I-T characteristic after the learning correction is performed by the learning correction portion 180b with the learning value A1 acquired by the learning value acquiring portion 180c.

When the torque balance determining portion 186 determines that the transmission torque T1 (Nm) and the braking torque Ts1. (Nm) are balanced, the first coupling control portion 180 stops the increase of the transmission torque T1 (Nm) increased with a predetermined gradient after the second predetermined time t2c has elapsed from the determination of completion of the release of the second clutch 32 by the disconnection completion determining portion 178a, and controls the third drive current I3 (mA) supplied to the left electromagnetic coil 110L of the left electronic control coupling 92L so as to output, to the left electronic control coupling 92L for the preset third predetermined time t3c (sec), the transmission torque T1 when the torque balance determining portion 186 determines that the transmission torque T1 and the braking torque Ts1 are balanced. The first coupling control portion 180 reduces the transmission torque T1 (Nm) to zero when the third predetermined time t3c (sec) has elapsed, and subsequently changes the transmission torque T1 (Nm) as needed according to the running state of the vehicle.

When the disconnection completion determining portion 178a of the second clutch control portion 178 determines that the release of the second clutch 32 is completed, and the coupling selecting portion 184 selects the learning correction for the I-T characteristic L of the right electronic control coupling 92R, the first coupling control portion 180 controls the third drive current I3 (mA) supplied to the left electromagnetic coil 110L of the left electronic control coupling 92L such that the transmission torque T1 transmitted from the clutch drum 94L to the clutch hub 98L becomes zero (Nm) until the third predetermined time t3c (sec) has elapsed after the torque balance determining portion 186 determines that the transmission torque T2 and the braking torque Ts1 are balanced.

When the disconnection completion determining portion 178a of the second clutch control portion 178 determines that the release of the second clutch 32 is completed, and the coupling selecting portion 184 selects the learning correction for the I-T characteristic L of the right electronic control coupling 92R, the second coupling control portion 182 controls the fourth drive current I4 supplied to the right electromagnetic coil 110R of the right electronic control coupling 92R such that the transmission torque T2 transmitted from the clutch drum 94R to the clutch hub 98R becomes zero (Nm) for the second predetermined time t2c (sec). When the second predetermined time t2c has elapsed, the second coupling control portion 182 controls the fourth drive current I4 supplied to the right electromagnetic coil 110R of the right electronic control coupling 92R such that the transmission torque T2 increases from a torque lower than the braking torque Ts1 generated by the braking torque generating portion 178b, i.e., the transmission torque T2 increases from zero (Nm), with a predetermined gradient.

When the coupling selecting portion 184 selects the learning correction for the I-T characteristic L of the right electronic control coupling 92R, and the disconnection completion determining portion 178a of the second clutch control portion 178 determines that the release of the second clutch 32 is completed, and the second predetermined time t2c (sec) has elapsed after the completion of the release of the second clutch 32, the torque balance determining portion 186 determines whether the transmission torque T2 (Nm) increased with a predetermined gradient by the second coupling control portion 182 is balanced with the braking torque Ts1 (Nm) generated in the clutch drum 94R of the right electronic control coupling 92R by the braking torque generating portion 178b. For example, when the rotation speed Np (rpm) of the propeller shaft 28 and the rotation speed Nwrr (rpm) of the rear wheel 16R are synchronized, i.e., when a difference falls within a predetermined range between the rotation speed Np (rpm) of the propeller shaft 28 and the rotation speed Nwrr (rpm) of the rear wheel 16R, the torque balance determining portion 186 determines that the transmission torque T2 (Nm) increased with a predetermined gradient by the second coupling control portion 182 is balanced with the predetermined braking torque Ts1 (Nm) generated in the clutch drum 94R of the right electronic control coupling 92R by the braking torque generating portion 178b. In the torque balance determining portion 186, since the rotation speed Np (rpm) of the propeller shaft 28 is detected by the third rotation speed sensor 168 after the second predetermined time t2c has elapsed from the determination of completion of the release of the second clutch 32 by the disconnection completion determining portion 178a of the second clutch control portion 178, i.e., after the braking torque Ts1 is applied to the second cam member 134 by the braking torque generating portion 178b and the second synchronizing device 144 is operated, the rotation speed Np (rpm) of the propeller shaft 28 is substantially the same as the rotation speed (rpm) of the output shaft 90, i.e., the clutch drum 94R, in terms of a converted value on the second rotation axis C2 due to the operation of the second synchronizing device 144. The rotation speed Nwrr (rpm) of the rear wheel 16R is the same as the rotation speed (rpm) of the clutch hub 98R.

When the coupling selecting portion 184 selects the learning correction for the I-T characteristic L of the right electronic control coupling 92R and the torque balance determining portion 186 determines that the transmission torque T2 (Nm) and the braking torque Ts1 (Nm) are balanced, a learning correction portion 182b included in the second coupling control portion 182 performs the learning correction for the I-T characteristic L stored in the I-T characteristic storage portion 182a with the braking torque Ts1 (Nm) and a fourth drive current I4c (mA), described later, acquired by a learning value acquiring portion 182c described later.

When the coupling selecting portion 184 selects the learning correction for the I-T characteristic L of the right electronic control coupling 92R and the torque balance determining portion 186 determines that the transmission torque T2 (Nm) and the braking torque Ts1 (Nm) are balanced, the learning value acquiring portion 182c acquires as a learning value A2 the predetermined fourth drive current I4c (mA) and the braking torque Ts1 (Nm) generated by the braking torque generating portion 178b when the torque balance determining portion 186 determines that the transmission torque T2 (Nm) and the braking torque Ts1 (Nm) are balanced, where the fourth drive current I4c is the current supplied to the right electromagnetic coil 110R of the right electronic control coupling 92R by the second coupling control portion 182.

When the coupling selecting portion 184 selects the learning correction for the I-T characteristic L of the right electronic control coupling 92R, and the torque balance determining portion 186 determines that the transmission torque T2 (Nm) and the braking torque Ts1 (NM) are balanced, and the learning value acquiring portion 182c acquires the braking torque Ts1 (Nm) and the fourth drive current I4c (mA) as the learning value A2, the learning correction portion 182b of the second coupling control portion 182 performs the learning correction with the learning value A2 for the I-T characteristic L stored in the I-T characteristic storage portion 182a. For example, when the learning value A2 is acquired by the learning value acquiring portion 182c, as shown in FIG. 6, the learning correction portion 182b of the second coupling control portion 182 moves the I-T characteristic L in parallel with the axis indicative of the transmission torque T2 (Nm) such that the I-T characteristic L preliminarily stored in the I-T characteristic storage portion 182a passes through the teaming value A2, for example. In FIG. 6, an I-T characteristic L2 indicated by a dashed-two dotted line is the I-T characteristic after the learning correction is performed by the learning correction portion 182b with the learning value A2 acquired by the learning value acquiring portion 182c.

When the torque balance determining portion 186 determines that the transmission torque T2 (Nm) and the braking torque Ts1 (Nm) are balanced, the second coupling control portion 182 stops the increase of the transmission torque T2 (Nm) increased with a predetermined gradient after the second predetermined time t2c has elapsed from the determination of completion of the release of the second clutch 32 by the disconnection completion determining portion 178a, and controls the fourth drive current I4 (mA) supplied to the right electromagnetic coil 110R of the right electronic control coupling 92R so as to output, to the right electronic control coupling 92R for the preset third predetermined time t3c (sec), the transmission torque T2 when the torque balance determining portion 186 determines that the transmission torque T2 and the braking torque Ts1 are balanced. The second coupling control portion 182 reduces the transmission torque T2 (Nm) to zero when the third predetermined time t3c (sec) has elapsed, and subsequently changes the transmission torque T2 (Nm) as needed according to the running state of the vehicle.

When the running state switching determining portion 174 determines that switching is performed from the two-wheel-drive running mode to the four-wheel-drive running mode, the second clutch control portion 178 supplies the second drive current I2 for a predetermined time to the second electromagnetic coil 146 of the second electromagnetic actuator 128 so as to move the second connecting/disconnecting sleeve 122 to the second meshing position to engage (connect) the second clutch 32 if the second position sensor 172 detects that the second connecting/disconnecting sleeve 122 is not positioned at the second meshing position. When the second drive current I2 is supplied for the predetermined time so that the second ball cam 138 is operated and the second piston 130 is reciprocated once by the first cam member 132, the second connecting/disconnecting sleeve 122 moves from the second non-meshing position to the second meshing position.

When the running state switching determining portion 174 determines that switching is performed from the two-wheel-drive running mode to the four-wheel-drive running mode, a connection completion determining portion 178c included in the second clutch control portion 178 determines whether the engagement (connection) of the second clutch 32 is completed. For example, when the second position sensor 172 detects that the second connecting/disconnecting sleeve 122 of the second clutch 32 is positioned at the second meshing position, the connection completion determining portion 178c determines that the engagement of the second clutch 32 is completed.

When the running state switching determining portion 174 determines that switching is performed from the two-wheel-drive running mode to the four-wheel-drive running mode and the connection completion determining portion 178c determines that the engagement of the second clutch 32 is completed, the first clutch control portion 176 supplies the first drive current I1 for a predetermined time to the first electromagnetic coil 72 of the first electromagnetic actuator 54 so as to move the first connecting/disconnecting sleeve 48 to the first meshing position to engage (connect) the first clutch 24 if the first position sensor 170 detects that the first connecting/disconnecting sleeve 48 is not positioned at the first meshing position. When the first drive current I1 is supplied for the predetermined time so that the first ball cam 64 is operated and the first piston 56 is reciprocated once by the first cam member 58, the first connecting/disconnecting sleeve 48 moves from the first non-meshing position to the first meshing position.

Figure 7:
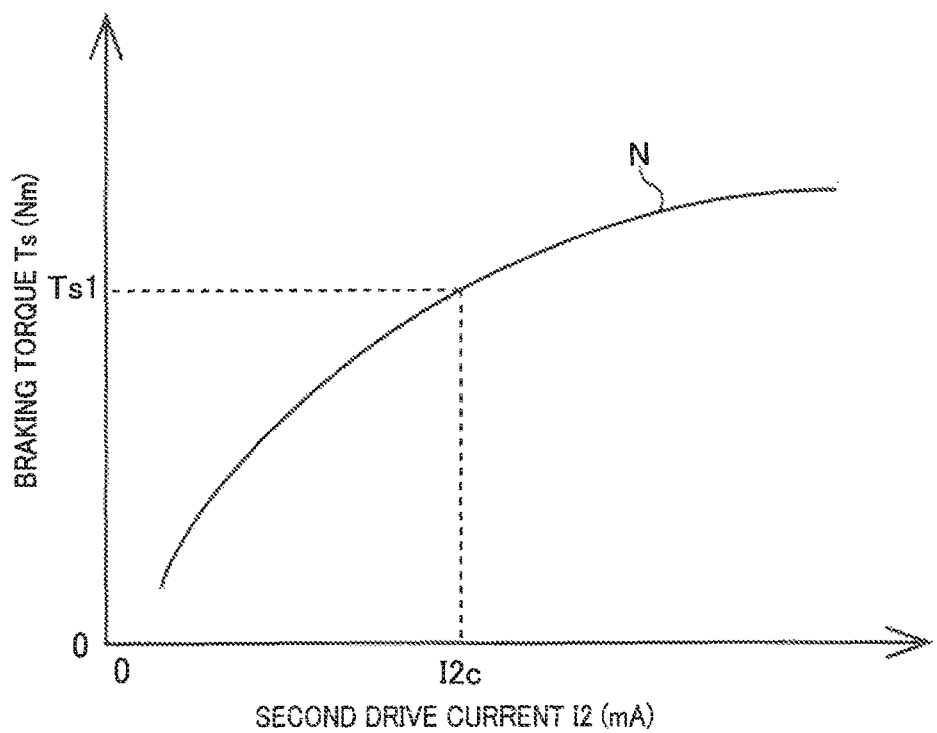
FIG. 7 is a diagram of an example of a nominal characteristic stored in a nominal characteristic storage portion provided in the electronic control device of FIG. 5.

For example, as shown in FIG. 7, a nominal characteristic storage portion (first storage portion) 178d included in the second clutch control portion 178 stores a nominal characteristic N indicative of a second relationship between the second drive current I2 (mA) supplied to the second electromagnetic coil 146 of the second electromagnetic actuator 128 in the second clutch 32 and the braking torque Ts (Nm) applied to the clutch drum 94L of the left electronic control coupling 92L and the clutch drum 94R of the right electronic control coupling 92R, i.e., to the output shaft 90, in the second electromagnetic actuator 128. For example, to apply the predetermined braking torque Ts1 (Nm) to the output shaft 90 during running of the vehicle, the braking torque generating portion 178b of the second clutch control portion (first control portion) 178 obtains a predetermined second drive current I2c (mA) by using the nominal characteristic N shown in FIG. 7, for example, and supplies the second drive current I2c (mA) to the second electromagnetic coil 146.

Figure 8:
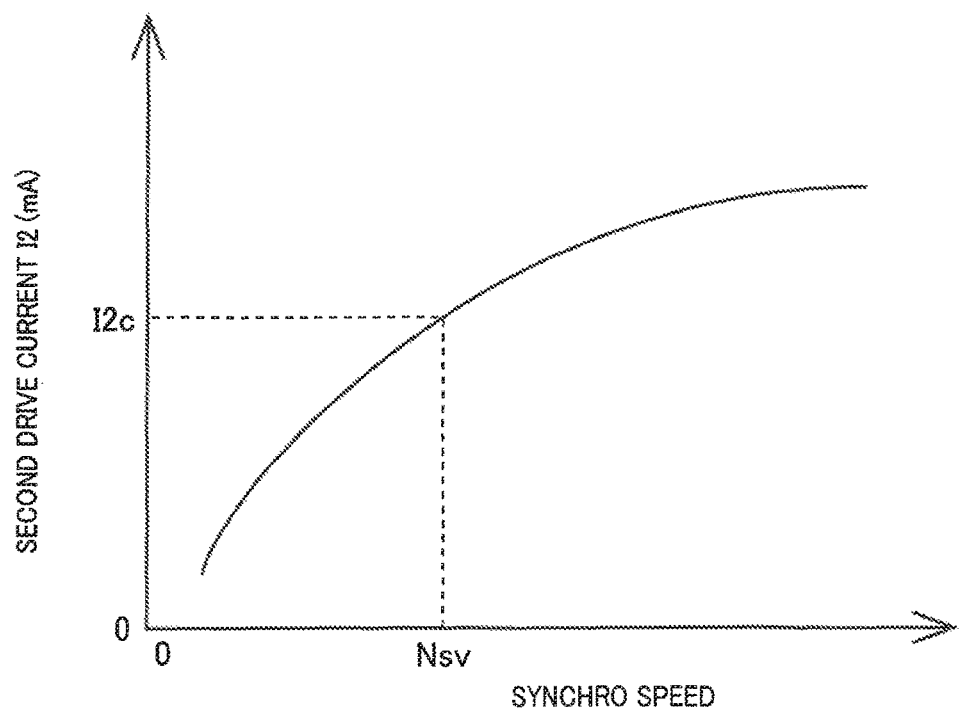
FIG. 8 is a diagram of an example of a map used for calculating a synchro speed (synchronization speed) from a predetermined second drive current supplied to a second electromagnetic coil so as to apply a predetermined braking torque by a braking torque generating portion in a deviation amount calculating portion provided in the electronic control device of FIG. 5.

When the running state switching determining portion 174 determines that switching is performed from the two-wheel-drive running mode to the four-wheel-drive running mode, a learning correction portion (first learning portion) 178e included in the second clutch control portion 178 performs a learning correction for the nominal characteristic N stored in the nominal characteristic storage portion 178d with an actual synchro synchronization speed Nsr of the propeller shaft 28 and a synchro synchronization speed Nsv of the propeller shaft 28 obtained from, for example, a map shown in FIG. 8 based on the predetermined second drive current I2c supplied to the second electromagnetic coil 146 for applying the braking torque Ts1 to the output shaft 90. The actual synchro synchronization speed Nsr of the propeller shaft 28 is a rising speed of the propeller shaft 28 from, for example, the state in which the rotation of the propeller shaft 28 is stopped with the first clutch 24 and the second clutch 32 released, until the second synchronizing device 144 is operated so that the rotation speed Np of the propeller shaft 28 is substantially synchronized with the rotation speed of the output shaft 90 in terms of the converted value on the second rotation axis C2. For example, the learning correction portion 178e calculates the actual synchro synchronization speed Nsr of the propeller shaft 28 from the rotation speed Np (rpm) of the propeller shaft 28 when the running state switching determining portion 174 determines that switching is performed from the two-wheel-drive running mode to the four-wheel-drive running mode, and the rotation speed Np (rpm) of the propeller shaft 28 when the connection completion determining portion 178c determines that the engagement of the second clutch 32 is completed.

When the running state switching determining portion 174 determines that switching is performed from the two-wheel-drive running mode to the four-wheel-drive running mode and the connection completion determining portion 178c determines that the engagement of the second clutch 32 is completed, a deviation amount calculating portion 178f included in the learning correction portion 178e calculates a deviation amount X between the nominal characteristic N preliminarily stored in the nominal characteristic storage portion 178d and a nominal characteristic N1 indicative of the second relationship of the second drive current I2 (mA) actually supplied to the second electromagnetic coil 146 and the braking torque Ts (Nm) actually applied to the output shaft 90. For example, the deviation amount calculating portion 178f calculates the deviation amount X by using, for example, a map not shown etc. from a difference (Nsr−Nsv) calculated by the learning correction portion 178e between the actual synchronous rotation speed Nsr of the propeller shaft 28 and the synchro synchronization speed Nsv of the propeller shaft 28 obtained from the map shown in FIG. 8.

Figure 9:
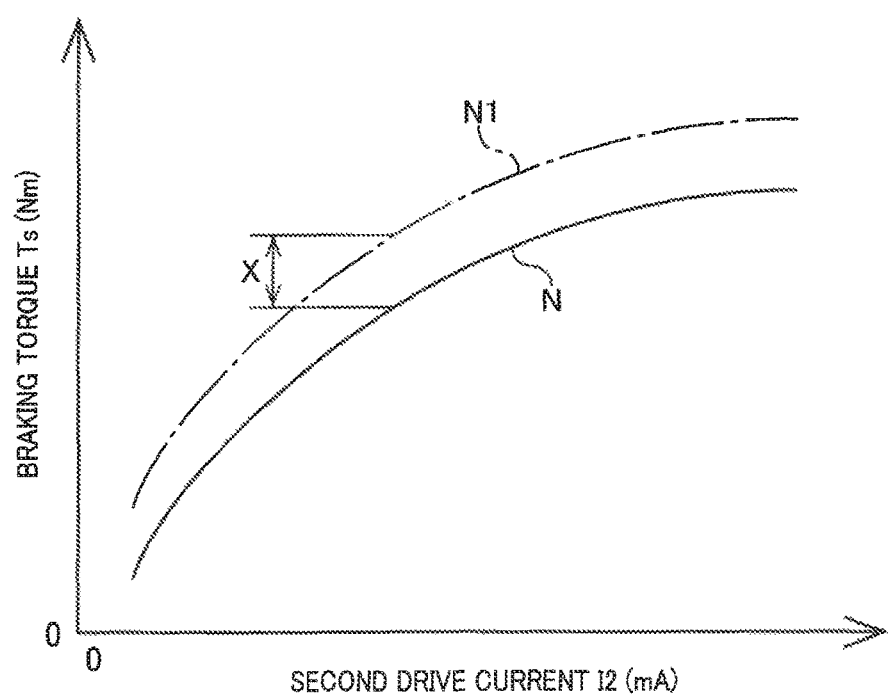
FIG. 9 is a diagram for explaining an example of a learning correction for the nominal characteristic with a deviation amount calculated by the deviation amount calculating portion in the learning correction portion provided in the electronic control device of FIG. 5.

When the deviation amount X is calculated by the deviation amount calculating portion 178f, the learning correction portion 178e of the second clutch control portion 178 performs the learning correction with the deviation amount X for the nominal characteristic N stored in the nominal characteristic storage portion 178d. For example, when the deviation amount X is calculated by the deviation amount calculating portion 178f, as shown in FIG. 9, the learning correction portion 178e moves the nominal characteristic N preliminarily stored in the nominal characteristic storage portion 178d in parallel with the axis indicative of the braking torque Ts by the deviation amount X, for example. In FIG. 9, the nominal characteristic N indicated by a solid line is the nominal characteristic N preliminarily stored in the nominal characteristic storage portion 178d, and the nominal characteristic N1 indicated by a dashed-dotted line is the nominal characteristic after the learning correction is performed by the learning correction portion 178e with the deviation amount X calculated by the deviation amount calculating portion 178f.

Figure 10:
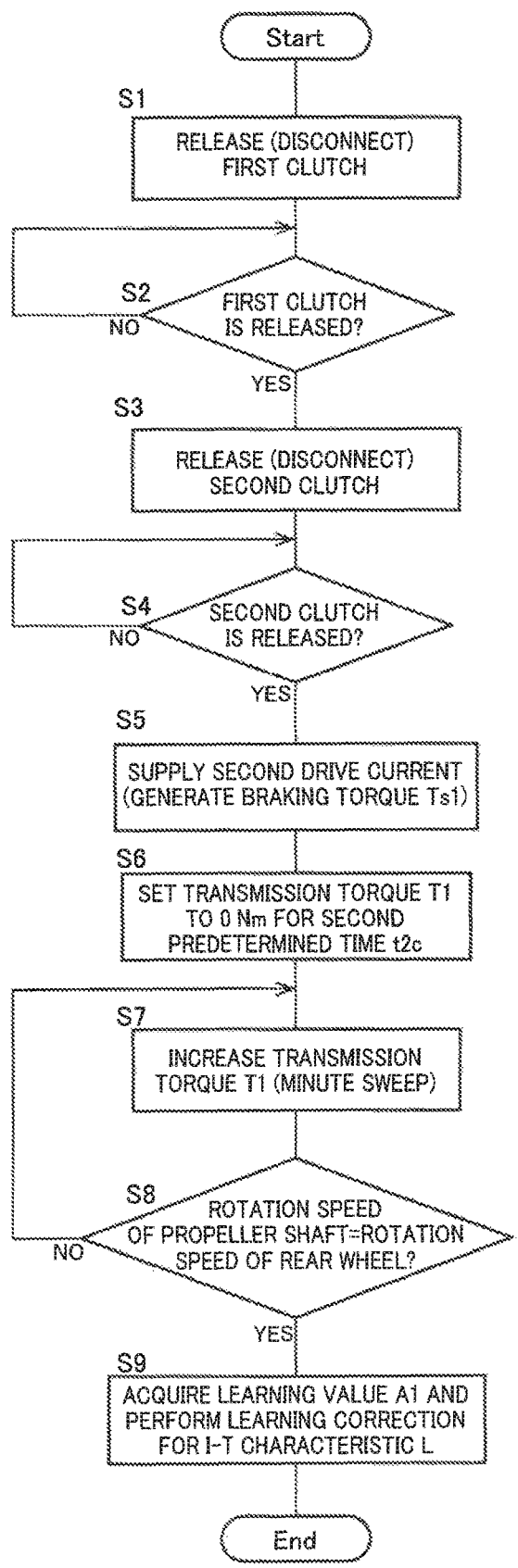
FIG. 10 is a flowchart for explaining an example of a control operation of a learning control in which the learning correction is performed for, for example, the I-T characteristic preliminarily stored in an I-T characteristic storage portion of a first coupling control portion controlling a left electronic control coupling when switching is performed from a four-wheel-drive running mode to a two-wheel-drive running mode during running of the vehicle in the electronic control device shown in FIG. 5.
Figure 11:
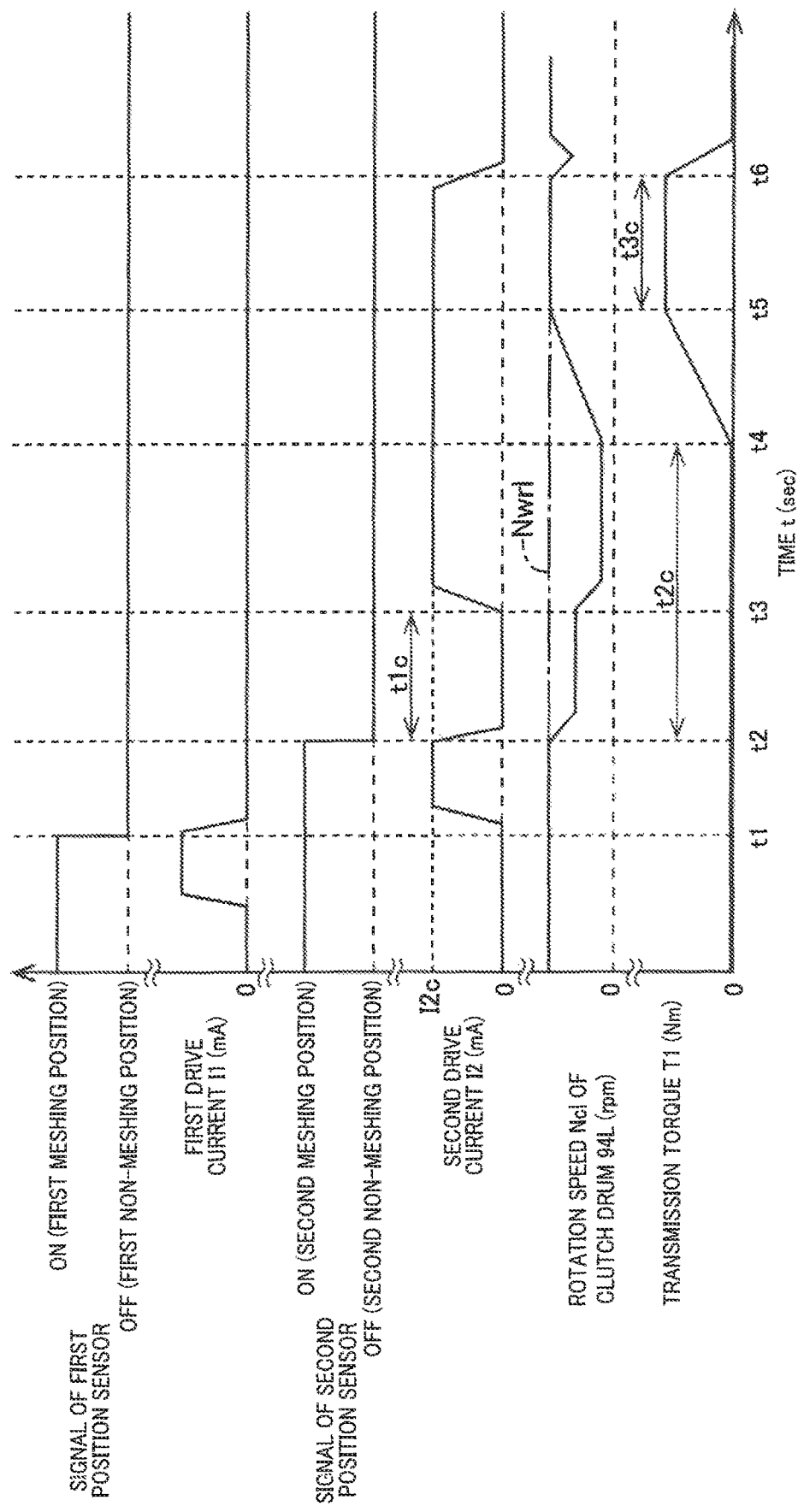
FIG. 11 is a time chart of an operation result based on the flowchart of FIG. 10.

FIG. 10 is a flowchart for explaining an example of a control operation of a learning control in which the learning correction is performed for, for example, the I-T characteristic L preliminarily stored in the I-T characteristic storage portion 180a of the first coupling control portion 180 controlling the left electronic control coupling 92L when switching is performed from the four-wheel-drive running mode to the two-wheel-drive running mode during running of the vehicle in the electronic control device 78. FIG. 11 is a time chart of an operation result based on the flowchart of FIG. 10.

First, at step (hereinafter, step will be omitted) S1 corresponding to the function of the first clutch control portion 176, the first drive current I1 is supplied for a predetermined time to the first electromagnetic coil 72 of the first electromagnetic actuator 54 so as to release (disconnect) the first clutch 24. At S2 corresponding to the function of the disconnection completion determining portion 176a, it is determined whether the release of the first clutch 24 is completed. If the determination of S2 is negative, S2 is executed again, and if the determination of S2 is affirmative (a first time point t1 shown in FIG. 11), S3 corresponding to the function of the second clutch control portion 178 is executed. At S3, the second drive current I2 is supplied for a predetermined time to the second electromagnetic coil 146 of the second electromagnetic actuator 128 so as to release (disconnect) the second clutch 32.

At S4 corresponding to the function of the disconnection completion determining portion 178a, it is determined whether the release of the second clutch 32 is completed. If the determination of S4 is negative, S4 is executed again, and if the determination of S4 is affirmative (a second time point t2 shown in FIG. 11), S5 corresponding to the function of the braking torque generating portion 178b is executed after the first predetermined time t1c (sec) has elapsed (a third time point t3 in FIG. 11). At S5, the second drive current I2c (mA) is supplied to the second electromagnetic coil 146 of the second electromagnetic actuator 128 so as to generate the predetermined braking torque Ts1 (Nm) in the clutch drum 94L of the left electronic control coupling 92L.

At S6 corresponding to the function of the first coupling control portion 180, the third drive current I3 supplied to the left electromagnetic coil 110L of the left electronic control coupling 92L is controlled such that the transmission torque T1 transmitted from the clutch drum 94L to the clutch hub 98L becomes zero (Nm) for the preset second predetermined time t2c (sec). At S7 corresponding to the function of the first coupling control portion 180, the third drive current I3 supplied to the left electromagnetic coil. 110L of the left electronic control coupling 92L is controlled such that the transmission torque T1 increases from zero (Nm) with a predetermined gradient after the second predetermined time t2c has elapsed (a fourth time point t4 shown in FIG. 11).

At S8 corresponding to the function of the torque balance determining portion 186, it is determined whether the transmission torque T1 (Nm) increased with a predetermined gradient is balanced with the predetermined braking torque Ts1 (Nm) applied to the clutch drum 94L of the left electronic control coupling 92L, i.e., whether the rotation speed Np (rpm) of the propeller shaft 28 is synchronized with the rotation speed Nwrl (rpm) of the rear wheel 16L in terms of the converted value on the second rotation axis C2. If the determination of S8 is negative, S7 is executed, and if the determination of S8 is affirmative (a fifth time point t5 shown in FIG. 11), S9 corresponding to the function of the learning correction portion 180b and the learning value acquiring portion 180c is executed. At S9, the braking torque Ts1 (Nm) and the third drive current I3c (mA) are acquired as the learning value A1, and the learning correction is performed with the acquired learning value A1 for the I-T characteristic L.

As described above, the electronic control device 78 of the four-wheel-drive vehicle 10 of this example includes the I-T characteristic storage portion 180a storing the I-T characteristic L indicative of the first relationship between the third drive current I3 supplied to the left electronic control coupling 92L and the transmission torque T1 of the left electronic control coupling 92L, the first coupling control portion 180 controlling the third drive current I3 supplied to the left electronic control coupling 92L based on the I-T characteristic L, and the learning correction portion 180b performing learning correction for the I-T characteristic L by applying the braking torque Ts1 to the clutch drum 94L by the second electromagnetic actuator 128, and the learning correction portion 180b performs the learning correction for the I-T characteristic L stored in the I-T characteristic storage portion 180a with the third drive current I3c and the braking torque Ts1 supplied to the left electronic control coupling 92L when the rotation speed of the clutch drum 94L, i.e., the rotation speed Np of the propeller shaft 28, is increased by the first coupling control portion 180 and it is determined that the transmission torque T1 is balanced with the braking torque Ts1 based on the rotation speed Np of the propeller shaft 28 and the rotation speed of the clutch hub 98L, i.e., the rotation speed Nwrl of the rear wheel 16L. Therefore, when the rotation speed of the clutch hub 94L, i.e., the rotation speed Np of the propeller shaft 28, is increased by the first coupling control portion 180 at the time of application of the braking torque Ts1 to the clutch drum 94L during running of the vehicle 10 and it is determined that the transmission torque T1 is balanced with the braking torque Ts1 based on the rotation speed Np of the propeller shaft 28 and the rotation speed Nwrl of the rear wheel 16L, the learning correction is performed for the I-T characteristic L stored in the I-T characteristic storage portion 180a, so that the transmission torque T1 can highly accurately be controlled with respect to a change of the left electronic control coupling 92L with lapse of time during utilizing the vehicle.

According to the electronic control device 78 of the four-wheel-drive vehicle 10 of this example, the first coupling control portion 180 increases the transmission torque T1 of the left electronic control coupling 92L from the torque lower than the braking torque Ts1, i.e., zero, when the braking torque Ts1 is applied to the clutch drum 94L of the left electronic control coupling 92L, and thereby increases the rotation speed of the clutch drum 94L which is lower than the rotation speed of the clutch hub 98L by the braking torque Ts1. Therefore, it can be determined that the transmission torque T1 is balanced with the braking torque Ts1 based on the rotation speed Np of the propeller shaft 28 which is substantially synchronized with the rotation speed of the clutch drum 94L by the second synchronizing device 144 in terms of the converted value on the second rotation axis C2, and the rotation speed Nwrl of the rear wheel 16L which is synchronized with the rotation speed of the clutch hub 98L.

According to the electronic control device 78 of the four-wheel-drive vehicle 10 of this example, the second electromagnetic actuator 128 changes the braking torque Ts applied to the clutch drum 94L according to the second drive current I2, and the electronic control device 78 includes the nominal characteristic storage portion 178d storing the nominal characteristic N indicative of the second relationship between the second drive current I2 supplied to the second electromagnetic actuator 128 and the braking torque Ts, the second clutch control portion 178 controlling the second drive current I2 supplied to the second electromagnetic actuator 128 based on the nominal characteristic N, and the learning correction portion 178e performing the learning correction for the nominal characteristic N. Therefore, the learning correction for the nominal characteristic N is performed by the learning correction portion 180b during utilizing the vehicle and the braking torque Ts of the second electromagnetic actuator 128 can highly accurately be controlled, so that the transmission torque T1 of the left electronic control coupling 92L can preferably highly accurately be controlled with respect to a change of the left electronic control coupling 92L with lapse of time during utilizing the vehicle.

According to the electronic control device 78 of the four-wheel-drive vehicle 10 of this example, the torque balance determining portion 186 is included that determines whether the transmission torque T1 is balanced with the braking torque Ts1, and the torque balance determining portion 186 determines that the transmission torque T1 is balanced with the braking torque Ts1 when the rotation speed Np of the propeller shaft 28 substantially synchronized with the rotation speed Ncl of the clutch drum 94L by the second synchronizing device 144 at the rotation speed Ncl of the clutch drum 94L, i.e., the converted value on the second rotation axis C2, is synchronized with the rotation speed of the clutch hub 98L, i.e., the rotation speed Nwrl of the rear wheel 16L. Therefore, for example, by using the first rotation speed sensor 164 and the third rotation speed sensor 168 detecting the rotation speed Nwrl of the rear wheel 16L corresponding to the rotation speed of the clutch hub 98L and the rotation speed Np of the propeller shaft 28 corresponding to the rotation speed Net of the clutch drum 94L in terms of the converted value on the second rotation axis C2 without using torque sensors each detecting the transmission torque T1 and the braking torque Ts, it can relatively highly accurately be determined whether the transmission torque T1 is balanced with the braking torque Ts1.

According to the electronic control device 78 of the four-wheel-drive vehicle 10 of this example, the pair of the left electronic control coupling 92L and the right electronic control coupling 92R is disposed for transmitting the torque output from the output shaft 90 respectively to the pair of the rear wheels 16L, 16R; the second clutch 32 connects/disconnects the power transmission path between the second ring gear 82 coupled in a power transmittable manner to the propeller shaft 28 to which a portion of the drive power transmitted from the engine 12 is input, and the output shaft 90; the second clutch 32 disconnects the power transmission path between the second ring gear 82 and the output shaft 90 before applying the braking torque Ts1 to the clutch drum 94L by the second electromagnetic actuator 128; and the first coupling control portion 180 increases the transmission torque T1 of the left electronic control coupling 92L from zero when the braking torque Ts1 is acting on the clutch drum 94L of the left electronic control coupling 92L. Therefore, after switching from the four-wheel-drive running to the two-wheel-drive running where the power transmission path between the second ring gear 82 and the output shaft 90 is disconnected by the second clutch 32 during running of the vehicle, the learning correction portion 180b performs the learning correction for the I-T characteristic L stored in the I-T characteristic storage portion 180a in the left electronic control coupling 92L.

According to the electronic control device 78 of the four-wheel-drive vehicle 10 of this example, the four-wheel-drive vehicle 10 includes the first clutch 24 connecting/disconnecting the power transmission path between the engine 12 and the propeller shaft 28, and the first clutch 24 disconnects the power transmission path between the engine 12 and the propeller shaft 28 before applying the braking torque Ts1 to the clutch drum 94L by the second electromagnetic actuator 128. Therefore, after switching from the four-wheel-drive running to the two-wheel-drive running where the propeller shaft 28 transmitting the drive power to the rear wheels 16L, 16R is disconnected from the rear wheels 16L, 16R by the second clutch 32 and the first clutch 24 during running of the vehicle, the learning correction is performed by the learning correction portion 180b for the I-T characteristic L stored in the I-T characteristic storage portion 180a in the left electronic control coupling 92L.

According to the electronic control device 78 of the four-wheel-drive vehicle 10 of this example, the second clutch 32 includes: the second connecting/disconnecting sleeve 122 having the second outer-circumferential connecting/disconnecting teeth 122a that can be meshed with the second inner-circumferential connecting/disconnecting teeth 82b formed on the second ring gear 82, disposed relatively non-rotatably and movably in the second rotation axis C2 direction with respect to the output shaft 90, and moved between the second meshing position at which the second outer-circumferential connecting/disconnecting teeth 122a are meshed with the second inner-circumferential connecting/disconnecting teeth 82b of the second ring gear 82 and the second non-meshing position at which the second outer-circumferential connecting/disconnecting teeth 122a are not meshed with the second inner-circumferential connecting/disconnecting teeth 82b of the second ring gear 82; the first return spring 124 urging the second connecting/disconnecting sleeve 122 from the second non-meshing position toward the second meshing position; the second piston 130 disposed relatively rotatably with respect to the output shaft 90 and moving the second connecting/disconnecting sleeve 122 to the second non-meshing position against the urging force of the first return spring 124; the second ball cam 138 having the pair of the first cam member 132 and the second cam member 134 relatively rotated around the second rotation axis C2 by the operation of the second electromagnetic actuator 128 and the second spherical rolling element 136 sandwiched between the groove-shaped cam surfaces 132b, 134b respectively formed on the facing surfaces 132a, 134a of the pair of the first cam member 132 and the second cam member 134 so that when the pair of the first cam member 132 and the second cam member 134 is relatively rotated, one of the pair of the first cam member 132 and the second cam member 134, i.e. the first cam member 132 is moved toward the second piston 130; and the second holder 142 having the first latching teeth 142a and the second latching teeth 142b and disposed relatively non-rotatably and non-movably in the second rotation axis C2 direction with respect to the output shaft 90 to latch the second piston 130 with the first latching teeth 142a or the second latching teeth 142b so as to position the second connecting/disconnecting sleeve 122 at the second meshing position and the second non-meshing position, and by applying the braking torque Ts to the second cam member 134 through the operation of the second electromagnetic actuator 128 to relatively rotate the first cam member 132 and the second cam member 134, the first cam member 132 is reciprocated to change the position of latching of the second piston 130 with the second holder 142, so that the second connecting/disconnecting sleeve 122 is moved between the second non-meshing position and the second meshing position. Therefore, by applying the braking torque Ts1 to the second cam member 134 through the operation of the second electromagnetic actuator 128 after the second connecting/disconnecting sleeve 122 is moved to the second non-meshing position by the second clutch 32, the rotation speed Ncl of the clutch drum 94L is preferably reduced lower than the rotation speed of the clutch hub 98L.

Another example of the present invention will be described. The portions common to the first example described above are denoted by the same reference numerals and will not be described.

Second Example

Figure 12:
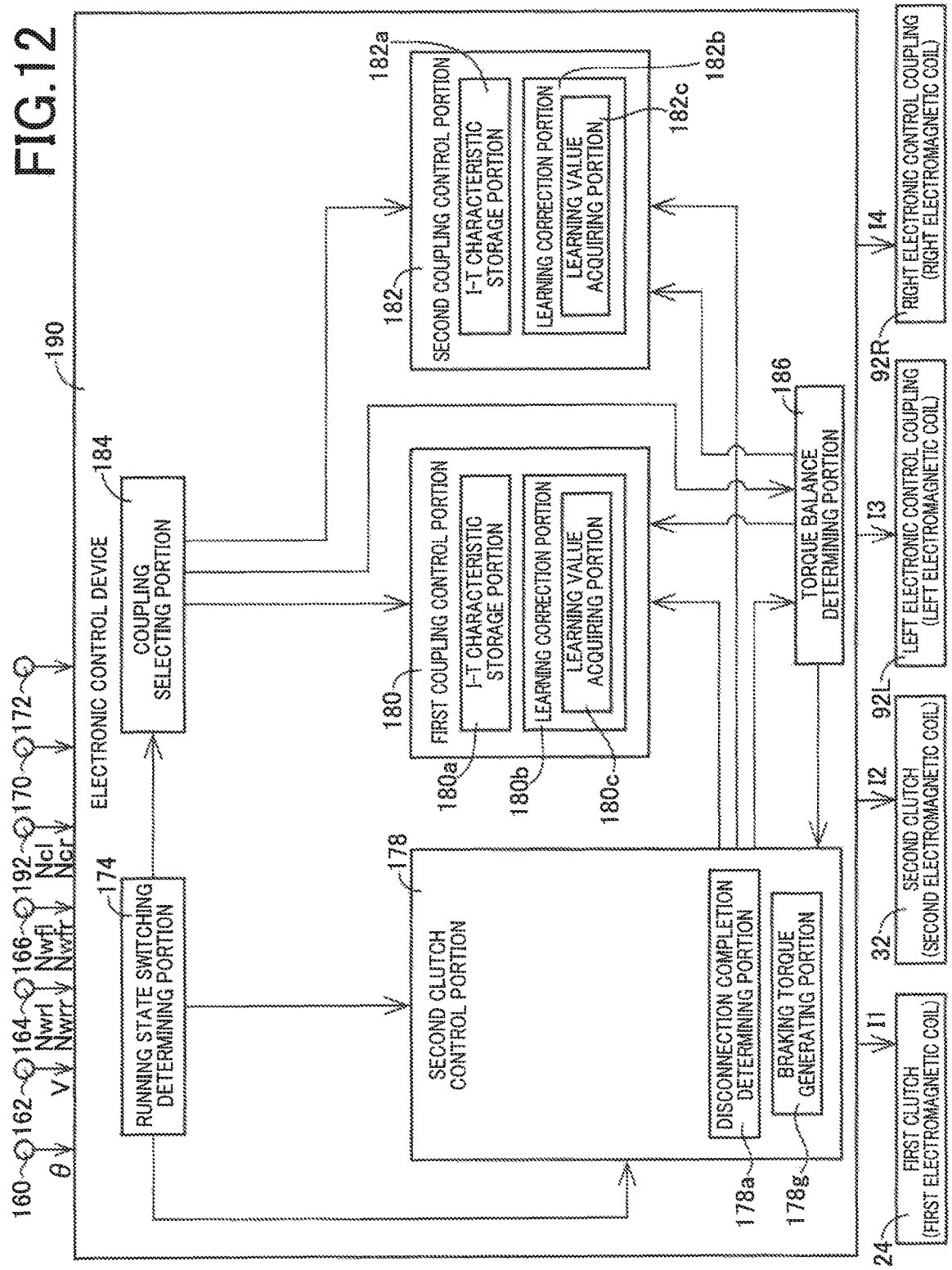
FIG. 12 is a diagram of an electronic control device of a four-wheel-drive vehicle according to another example of the present invention and is a diagram showing a functional block diagram for explaining a main portion of a control function included in the electronic control device.
Figure 13:
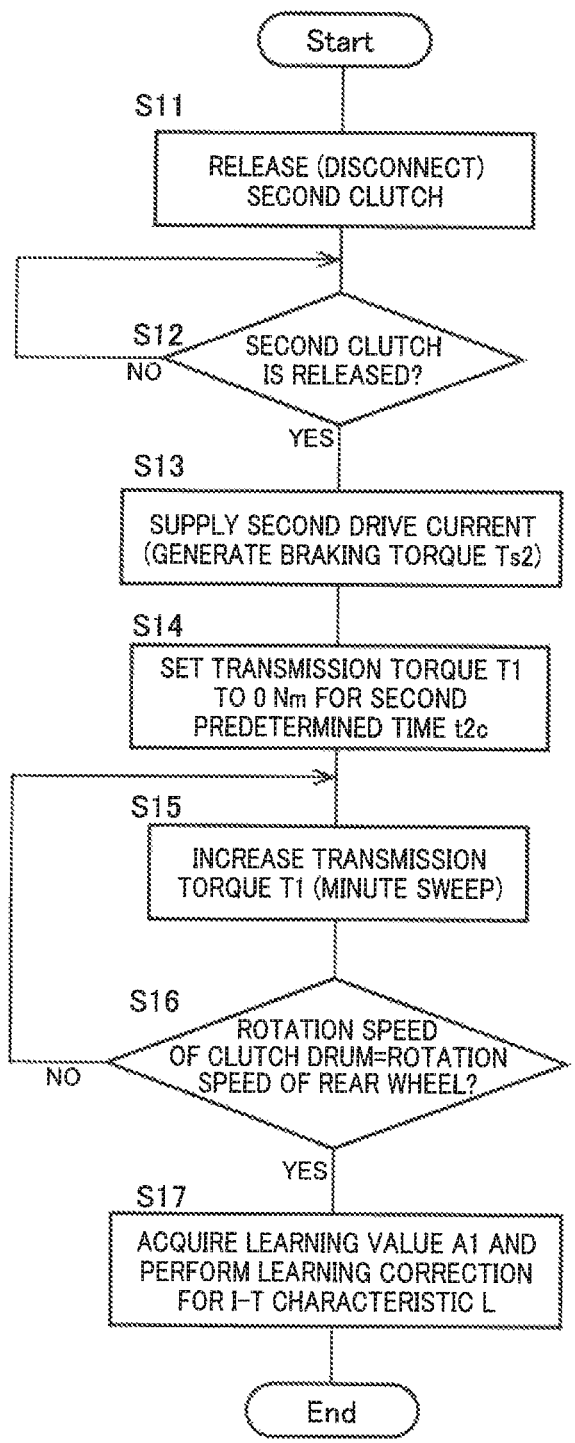
FIG. 13 is a flowchart for explaining an example of a control operation of a learning control in which the learning correction is performed for, for example, the I-T characteristic preliminarily stored in the I-T characteristic storage portion of the first coupling control portion controlling the left electronic control coupling when switching is performed from the four-wheel-drive running mode to the two-wheel-drive running mode during running of the vehicle in the electronic control device shown in FIG. 12.
Figure 14:
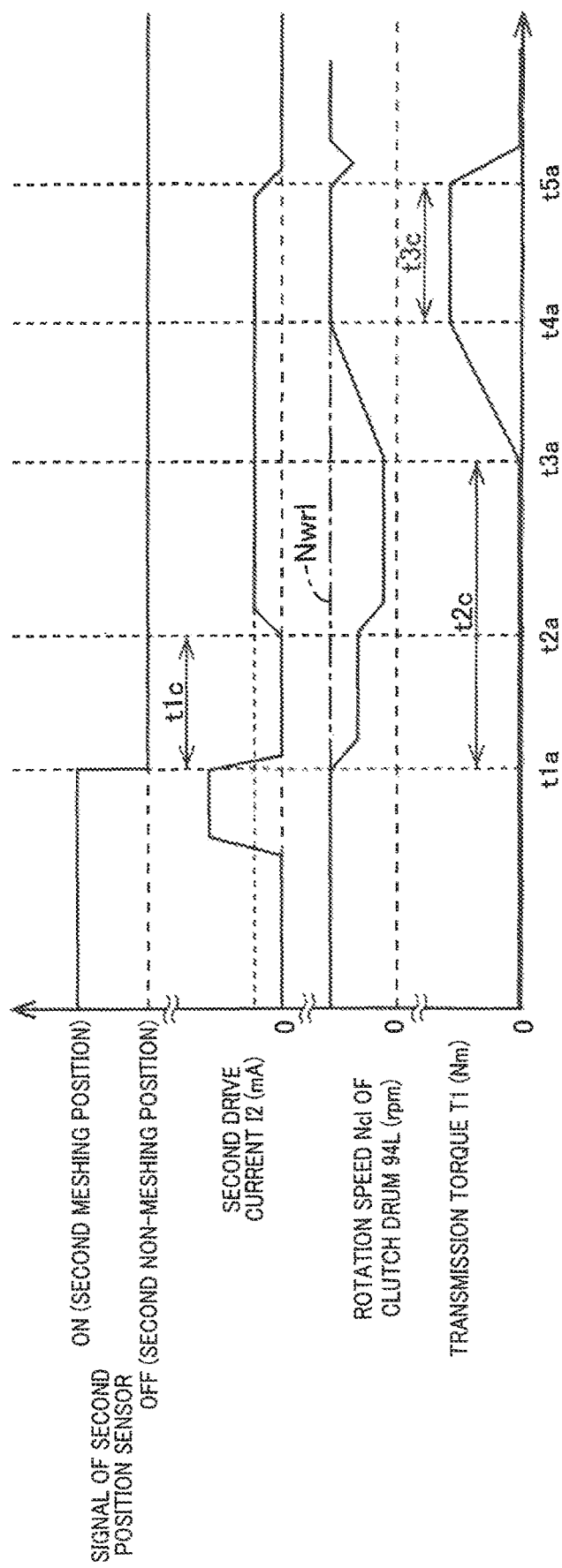
FIG. 14 is a time chart of an operation result based on the flowchart of FIG. 13.

FIGS. 12 to 14 are diagrams for explaining an electronic control device (control device) 190 of the four-wheel-drive vehicle 10 according to another example of the present invention. The electronic control device 190 of the four-wheel-drive vehicle 10 of the present example is different from the electronic control device 78 of the first example in that since the function of the first clutch control portion 176 is deleted, the first clutch 24 is in an engaged state without being released when the four-wheel-drive running is switched to the two-wheel-drive running, that the functions of the nominal characteristic storage portion 178d, the learning correction portion 178e, and the connection completion determining portion 178c included in the second clutch control portion 178 are deleted, that the function of a braking torque generating portion 178g included in the second clutch control portion 178 is different, and that instead of the third rotation speed sensor 168 detecting the rotation speed Np (rpm) of the propeller shaft 28, a fourth rotation speed sensor 192 detecting the rotation speeds Ncl, Ncr (rpm) of the clutch drums 94L, 94R is used for making a determination by the torque balance determining portion 186, etc., and is substantially the same as the electronic control device 78 of the first example in terms of the other aspects.

When the running state switching determining portion 174 determines that switching is performed from the four-wheel-drive running mode to the two-wheel-drive running mode, the second clutch control portion 178 supplies the second drive current I2 for a predetermined time to the second electromagnetic coil 146 of the second electromagnetic actuator 128 so as to move the second connecting/disconnecting sleeve 122 to the second non-meshing position to release (disconnect) the second clutch 32 if the second position sensor 172 detects that the second connecting/disconnecting sleeve 122 is positioned at the second meshing position.

When the disconnection completion determining portion 178a determines that the release of the second clutch 32 is completed, and the preset first predetermined time t1c (sec) has elapsed after the determination, the braking torque generating portion 178g included in the second clutch control portion 178 controls the second drive current I2 (mA) supplied to the second electromagnetic coil 146 of the second electromagnetic actuator 128 so as to generate a predetermined braking torque Ts2 (Nm) set in advance in the clutch drum 94L of the left electronic control coupling 92L and the clutch drum 94R of the right electronic control coupling 92R, i.e., in the output shaft 90 until the third predetermined time t3c (sec) has elapsed after the torque balance determining portion 186 described later determines that the transmission torques T1, T2 and the braking torque Ts2 are balanced. In the braking torque generating portion 178g, the magnitude of the braking torque Ts2 (Nm) applied to the output shaft 90 is such a magnitude that even if the braking torque Ts2 is applied to the second cam member 134 in the second ball cam 138, the first cam member 132 and the second cam member 134 do not relatively rotate and the second ball cam 138 is not operated by the urging force of the second return spring 140.

When the coupling selecting portion 184 selects the learning correction for the I-T characteristic L of the left electronic control coupling 92L, and the disconnection completion determining portion 178a of the second clutch control portion 178 determines that the release of the second clutch 32 is completed, and the second predetermined time t2c (sec) has elapsed after the completion of the release of the second clutch 32, the torque balance determining portion 186 determines whether the transmission torque T1 (Nm) increased with a predetermined gradient by the first coupling control portion 180 is balanced with the braking torque Ts2 (Nm) generated in the clutch drum 94L of the left electronic control coupling 92L by the braking torque generating portion 178g. For example, when the rotation speed Ncl (rpm) of the clutch drum 94L and the rotation speed Nwrl (rpm) of the rear wheel 16L are synchronized, i.e., when a difference falls within a predetermined range between the rotation speed Ncl (rpm) of the clutch drum 94L and the rotation speed Nwrl (rpm) of the rear wheel 16L, the torque balance determining portion 186 determines that the transmission torque T1 (Nm) increased with a predetermined gradient by the first coupling control portion 180 is balanced with the braking torque Ts2 (Nm) generated in the clutch drum 94L of the left electronic control coupling 92L by the braking torque generating portion 178g.

When the coupling selecting portion 184 selects the learning correction for the I-T characteristic L of the right electronic control coupling 92R, and the disconnection completion determining portion 178a of the second clutch control portion 178 determines that the release of the second clutch 32 is completed, and the second predetermined time t2c (sec) has elapsed after the completion of the release of the second clutch 32, the torque balance determining portion 186 determines whether the transmission torque T2 (Nm) increased with a predetermined gradient by the second coupling control portion 182 is balanced with the braking torque Ts2 (Nm) generated in the clutch drum 94R of the right electronic control coupling 92R by the braking torque generating portion 178g. For example, when the rotation speed Ncr (rpm) of the clutch drum 94R and the rotation speed Nwrr (rpm) of the rear wheel 16R are synchronized, i.e., when a difference falls within a predetermined range between the rotation speed Ncr (rpm) of the clutch drum 94R and the rotation speed Nwrr (rpm) of the rear wheel 16R, the torque balance determining portion 186 determines that the transmission torque T2 (Nm) increased with a predetermined gradient by the second coupling control portion 182 is balanced with the braking torque Ts2 (Nm) generated in the clutch drum 94R of the right electronic control coupling 92R by the braking torque generating portion 178g.

FIG. 13 is a flowchart for explaining an example of a control operation of a learning control in which the learning correction is performed for, for example, the I-T characteristic L preliminarily stored in the I-T characteristic storage portion 180a of the first coupling control portion 180 controlling the left electronic control coupling 92L when switching is performed from the four-wheel-drive running mode to the two-wheel-drive running mode during running of the vehicle in the electronic control device 190. FIG. 14 is a time chart of an operation result based on the flowchart of FIG. 13.

First, at step (hereinafter, step will be omitted) S11 corresponding to the function of the second clutch control portion 178, the second drive current I2 is supplied for a predetermined time to the second electromagnetic coil 146 of the second electromagnetic actuator 128 so as to release (disconnect) the second clutch 32. At S12 corresponding to the function of the disconnection completion determining portion 178a, it is determined whether the release of the second clutch 32 is completed. If the determination of S12 is negative, S12 is executed again, and if the determination of S12 is affirmative (a first time point t1a shown in FIG. 14), S13 corresponding to the function of the braking torque generating portion 178g is executed after the first predetermined time t1c has elapsed (a second time point t2a shown in FIG. 14). At S13, the second drive current I2 (mA) is supplied to the second electromagnetic coil 146 of the second electromagnetic actuator 128 so as to generate the predetermined braking torque Ts2 (Nm) in the clutch drum 94L of the left electronic control coupling 92L.

At S14 corresponding to the function of the first coupling control portion 180, the third drive current I3 supplied to the left electromagnetic coil 110L of the left electronic control coupling 92L is controlled such that the transmission torque T1 transmitted from the clutch drum 94L to the clutch hub 98L becomes zero (Nm) for the preset second predetermined time t2c (sec). At S15 corresponding to the function of the first coupling control portion 180, the third drive current I3 supplied to the left electromagnetic coil 110L of the left electronic control coupling 92L is controlled such that the transmission torque T1 increases from zero (Nm) with a predetermined gradient after the second predetermined time t2c has elapsed (a third time point t3a shown in FIG. 14).

At S16 corresponding to the function of the torque balance determining portion 186, it is determined whether the transmission torque T1 (Nm) increased with a predetermined gradient is balanced with the braking torque Ts2 (Nm) generated in the clutch drum 94L of the left electronic control coupling 92L, i.e., whether the rotation speed Ncl (rpm) of the clutch drum 94L is synchronized with the rotation speed Nwrl (rpm) of the rear wheel 16L. If the determination of S16 is negative, S15 is executed, and if the determination of S16 is affirmative (a fourth time point t4 shown in FIG. 14), S17 corresponding to the function of the learning correction portion 180b and the learning value acquiring portion 180c is executed. At S17, the braking torque Ts2 (Nm) and the predetermined third drive current I3 (mA) supplied to the left electromagnetic coil 110L at the fourth time point t4a are acquired as the learning value, and the learning correction is performed with the acquired learning value for the I-T characteristic L.

Although the examples of the present invention have been described in detail with reference to the drawings, the present invention is also applicable to other forms.

In the examples described above, the four-wheel-drive vehicle 10 includes a pair of the left electronic control coupling 92L and the right electronic control coupling 92R; however, for example, the present invention may be applied to the four-wheel-drive vehicle 10 including only one of the pair of the left electronic control coupling 92L and the right electronic control coupling 92R. For example, if only the left electronic control coupling 92L is included, the four-wheel-drive vehicle 10 has a differential device disposed between the output shaft 90 and the rear wheel 16R instead of the right electronic control coupling 92R, and a connecting/disconnecting device selectively connecting/disconnecting a power transmission path between the output shaft 90 and the differential device is provided between the output shaft 90 and a differential case of the differential device. If the learning correction is performed for the I-T characteristic L stored in the I-T characteristic storage portion 180a in the left electronic control coupling 92L in the four-wheel-drive vehicle 10 as described above, the power transmission path between the output shaft 90 and the differential device is disconnected by the connecting/disconnecting device.

In the examples described above, the learning correction portions 180b, 182b alternately perform the learning correction for the I-T characteristic L each time switching is performed from the four-wheel-drive running mode to the two-wheel-drive running mode by the running state switching determining portion 174; however, the learning correction may not necessarily be performed each time switching is performed from the four-wheel-drive running mode to the two-wheel-drive running mode by the running state switching determining portion 174 and; for example, the learning correction may be performed when the number of times of switching from the four-wheel-drive running mode to the two-wheel-drive running mode is a predetermined number of times.

In the examples described above, the braking torque generating portions 178b, 178g generate the braking torques Ts1, Ts2 when the disconnection completion determining portion 178a determines that the release of the second clutch 32 is completed and the preset first predetermined time t1c (sec) has elapsed after the determination; however, the braking torques Ts1, Ts2 may be generated immediately after the disconnection completion determining portion 178a determines that the release of the second clutch 32 is completed. The first coupling control portion 180 and the second coupling control portion 182 control the transmission torques T1, T2 to increase from zero (Nm) with a predetermined gradient after the preset second predetermined time t2c (sec) has elapsed from the determination of completion of the release of the second clutch 32 by the disconnection completion determining portion 178a of the second clutch control portion 178; however, for example, the transmission torques T1, T2 may be controlled to increase from zero (Nm) with a predetermined gradient immediately after the disconnection completion determining portion 178a determines that the release of the second clutch 32 is completed.

The above description is merely an embodiment and the present invention can be implemented in variously modified and improved forms based on the knowledge of those skilled in the art.

REFERENCE SIGNS LIST

10: Four-wheel-drive vehicle
12: Engine (Drive power source)
14L, 14R: Front wheels (Main drive wheels)
16L, 16R: Rear wheels (Auxiliary drive wheels)
24: First clutch (First connecting/disconnecting mechanism)
28: Propeller shaft
32: Second clutch (Connecting/disconnecting mechanism)
78, 190: Electronic control device (Control device)
82: Second ring gear (Ring gear)
82b: Second inner-circumferential connecting/disconnecting teeth (First connecting/disconnecting teeth)
90: Output shaft
92L: Left electronic control coupling (Electronic control coupling)
92R: Right electronic control coupling (Electronic control coupling)
94L, 94R: Clutch drum (Input-side rotating member)
98L, 98R: Clutch hub (Output-side rotating member)
122: Second connecting/disconnecting sleeve (Connecting/disconnecting sleeve
122a: Second outer-circumferential connecting/disconnecting teeth (Second connecting/disconnecting teeth)
124: First return spring (Return spring)
128: Second electromagnetic actuator (Electromagnetic actuator)
130: Second piston (Piston)
132: First cam member (Cam member)
132a: Facing surface
132b: Cam surface
134: Second cam member (Cam member)
134a: Facing surface
134b: Cam surface 136: Second spherical rolling element (Spherical rolling element)
138: Second ball cam (Ball cam)
142: Second holder (Holder)
142a: First latching teeth (Latching teeth)
142b: Second latching teeth (Latching teeth)
178: Second clutch control portion
178b, 178g: Braking torque generating portion
178d: Nominal characteristic storage portion (First storage portion)
178e: Learning correction portion (First learning portion)
180: First coupling control portion (Control portion)
180a: I-T characteristic storage portion (Storage portion)
180b: Learning correction portion (Learning portion)
182: Second coupling control portion (Control portion)
182a: I-T characteristic storage portion (Storage portion)
182b: Learning correction portion (Learning portion)
186: Torque balance determining portion
I2: Second drive current (First drive current)
I3: Third drive current (Drive current)
I4: Fourth drive current (Drive current)
T1, T2: Transmission torque
Ts: Braking torque

What is claimed is:

1. A control device of a four-wheel-drive vehicle having an electronic control coupling changing a transmission torque transmitted from an input-side rotating member to an output-side rotating member depending on a supplied drive current, and a connecting/disconnecting mechanism connecting/disconnecting an input of power to the input-side rotating member of the electronic control coupling through an operation of an electromagnetic actuator applying a braking torque to the input-side rotating member of the electronic control coupling, the control device comprising:
   a storage portion configured to store a first relationship between the drive current supplied to the electronic control coupling and the transmission torque of the electronic control coupling;
   a control portion configured to control the drive current supplied to the electronic control coupling based on the first relationship; and
   a learning portion configured to perform a correction for the first relationship through learning by applying the braking torque to the input-side rotating member by the electromagnetic actuator, wherein
   the learning portion performs the correction for the first relationship stored in the storage portion by using the drive current supplied to the electronic control coupling and the braking torque at the time of determination that the transmission torque is balanced with the braking torque based on a rotational speed of the input-side rotating member and a rotational speed of the output-side rotating member while the rotational speed of the input-side rotating member is increased by the control portion.

2. The control device of the four-wheel-drive vehicle according to claim 1, wherein the control portion increases the transmission torque of the electronic control coupling from a torque lower than the braking torque when the braking torque is applied to the input-side rotating member of the electronic control coupling, and thereby increases the rotation speed of the input-side rotating member, which is rotating slower than the output-side rotating member, by the braking torque.

3. The control device of the four-wheel-drive vehicle according to claim 2, wherein
   the electronic control coupling is comprised of a pair of electronic control couplings transmitting a torque output from an output shaft respectively to a pair of auxiliary drive wheels, wherein
   the connecting/disconnecting mechanism connects/disconnects a power transmission path between a ring gear and the output shaft, wherein the ring gear is coupled in a power transmittable manner to a propeller shaft to which a portion of a drive power transmitted from a drive power source is input, wherein
   the connecting/disconnecting mechanism disconnects the power transmission path between the ring gear and the output shaft before applying the braking torque to the input-side rotating member by the electromagnetic actuator, and wherein
   the control portion increases the transmission torque of one of the pair of electronic control couplings from zero when the braking torque is applied on the input-side rotating member of the electronic control coupling.

4. The control device of the four-wheel-drive vehicle according to claim 3, wherein
   the four-wheel-drive vehicle includes a first connecting/disconnecting mechanism connecting/disconnecting a power transmission path between the drive power source and the propeller shaft, and wherein
   the first connecting/disconnecting mechanism disconnects the power transmission path between the drive power source and the propeller shaft before applying the braking torque to the input-side rotating member by the electromagnetic actuator.

5. The control device of the four-wheel-drive vehicle according to claim 3, wherein
   the connecting/disconnecting mechanism includes
   a connecting/disconnecting sleeve including second connecting/disconnecting teeth that are meshed with first connecting/disconnecting teeth formed on the ring gear, disposed relatively non-rotatably and movably in a rotation axis direction with respect to the output shaft, and moved between a meshing position at which the second connecting/disconnecting teeth are meshed with the first connecting/disconnecting teeth and a non-meshing position at which the second connecting/disconnecting teeth are not meshed with the first connecting/disconnecting teeth,
   a return spring urging the connecting/disconnecting sleeve in a direction from the non-meshing position toward the meshing position,
   a piston disposed relatively rotatably with respect to the output shaft and moving the connecting/disconnecting sleeve to the non-meshing position against the urging force of the return spring,
   a ball cam including a pair of cam members relatively rotated around the rotation axis by an operation of the electromagnetic actuator and a spherical rolling element sandwiched between groove-shaped cam surfaces respectively formed on facing surfaces of the pair of cam members so that when the pair of cam members is relatively rotated, one of the pair of cam members is moved toward the piston, and
   a holder having a plurality of levels of latching teeth and disposed relatively non-rotatably and non-movably in the rotation axis direction with respect to the output shaft to latch the piston with each one tooth of the plurality of levels of latching teeth so as to position the connecting/disconnecting sleeve at the meshing position or the non-meshing position, and wherein by applying the braking torque to the other of the pair of cam members through the operation of the electromagnetic actuator to relatively rotate the pair of cam members, one of the pair of cam members is reciprocated to change a position of latching of the piston with the holder, so that the connecting/disconnecting sleeve is moved between the non-meshing position and the meshing position.

6. The control device of the four-wheel-drive vehicle according to claim 1, wherein the electromagnetic actuator changes the braking torque applied to the input-side rotating member according to a first drive current supplied thereto, and wherein the control device comprises a first storage portion configured to store a second relationship between the first drive current supplied to the electromagnetic actuator and the braking torque, a first control portion configured to control the first drive current supplied to the electromagnetic actuator based on the second relationship, and a first learning portion configured to perform a correction for the second relationship through learning.

7. The control device of the four-wheel-drive vehicle according to claim 1, comprising a torque balance determining portion configured to determine whether the transmission torque is balanced with the braking torque, wherein the torque balance determining portion determines that the transmission torque is balanced with the braking torque when the rotation speed of the input-side rotating member is synchronized with the rotation speed of the output-side rotating member.

* * * * *